(12) United States Patent
Desclos et al.

(10) Patent No.: US 11,971,308 B2
(45) Date of Patent: Apr. 30, 2024

(54) TEMPERATURE SENSOR ASSEMBLY FACILITATING BEAM STEERING IN A TEMPERATURE MONITORING NETWORK

(71) Applicant: Kyocera AVX Components Corporation, Fountain Inn, SC (US)

(72) Inventors: Laurent Desclos, San Diego, CA (US); Craig W. Nies, Greenville, SC (US); Olivier Pajona, Biot (FR)

(73) Assignee: KYOCERA AVX COMPONENTS CORPORATION, Fountain Inn, SC (US)

( * ) Notice: Subject to any disclaimer, the term of this patent is extended or adjusted under 35 U.S.C. 154(b) by 339 days.

(21) Appl. No.: 17/412,427

(22) Filed: Aug. 26, 2021

(65) Prior Publication Data

US 2022/0065703 A1 Mar. 3, 2022

Related U.S. Application Data

(60) Provisional application No. 63/070,634, filed on Aug. 26, 2020.

(51) Int. Cl.
*G01K 1/02* (2021.01)
*G01K 1/024* (2021.01)
*G08C 17/02* (2006.01)
*H01Q 3/36* (2006.01)

(52) U.S. Cl.
CPC ............. *G01K 1/026* (2013.01); *G01K 1/024* (2013.01); *G08C 17/02* (2013.01); *H01Q 3/36* (2013.01)

(58) Field of Classification Search
None
See application file for complete search history.

(56) References Cited

U.S. PATENT DOCUMENTS

| | | | |
|---|---|---|---|
| 6,765,536 B2 | 7/2004 | Phillips et al. |
| 6,987,493 B2 | 1/2006 | Chen |
| 7,068,234 B2 | 6/2006 | Sievenpiper |
| 7,215,289 B2 | 5/2007 | Harano |
| 7,830,320 B2 | 11/2010 | Shamblin |
| 7,911,402 B2 | 3/2011 | Rowson et al. |

(Continued)

OTHER PUBLICATIONS

The International Search Report and Written Opinion Corresponding to Application No. PCT/US2021/047728 dated Dec. 21, 2021 (14 pages).

*Primary Examiner* — Wilson Lee
(74) *Attorney, Agent, or Firm* — Dority & Manning, P.A.

(57) ABSTRACT

A temperature sensor assembly can include a first temperature sensor that can be configured to obtain a first temperature measurement of a user. The temperature sensor assembly can further include a second temperature sensor that can be configured to obtain a second temperature measurement of the user. The temperature sensor assembly can further include one or more processors that can be configured to determine a third temperature measurement indicative of a temperature of the user based at least in part on the first temperature measurement and the second temperature measurement. The temperature sensor assembly can further include a base station communication antenna system that can include a modal antenna that can be configured to communicate the third temperature measurement with a base station based at least in part on a beam steering operation.

20 Claims, 8 Drawing Sheets

(56) References Cited

U.S. PATENT DOCUMENTS

| | | |
|---|---|---|
| 8,362,962 B2 | 1/2013 | Rowson et al. |
| 8,446,318 B2 | 5/2013 | Ali et al. |
| 8,648,755 B2 | 2/2014 | Rowson et al. |
| 8,717,241 B2 | 5/2014 | Shamblin et al. |
| 9,065,496 B2 | 6/2015 | Rowson et al. |
| 9,231,669 B2 | 1/2016 | Desclos et al. |
| 9,240,634 B2 | 1/2016 | Rowson et al. |
| 9,425,497 B2 | 8/2016 | Pajona et al. |
| 9,439,151 B2 | 9/2016 | Zhu et al. |
| 9,479,242 B2 | 10/2016 | Desclos et al. |
| 9,590,703 B2 | 3/2017 | Desclos et al. |
| 9,755,305 B2 | 9/2017 | Deslos et al. |
| 9,755,580 B2 | 9/2017 | Desclos et al. |
| 10,051,493 B2 | 8/2018 | Pajona et al. |
| 10,171,058 B1 * | 1/2019 | Alameh ............... H04R 29/002 |
| 2006/0056487 A1 | 3/2006 | Kuroda et al. |
| 2012/0319847 A1 | 12/2012 | Heller |
| 2013/0147672 A1 | 6/2013 | Desclos et al. |
| 2018/0049646 A1 | 2/2018 | Ellis et al. |
| 2019/0001139 A1 * | 1/2019 | Mishra ............... A61N 1/36075 |
| 2019/0053713 A1 * | 2/2019 | DeBates ................ F24F 13/30 |
| 2020/0101291 A1 * | 4/2020 | Yakovlev ............... A61N 2/006 |
| 2020/0376266 A1 * | 12/2020 | Toong ................ A61N 1/36007 |
| 2021/0186336 A1 | 6/2021 | Bellifemine et al. |

* cited by examiner

TEMPERATURE SENSOR ASSEMBLY FACILITATING BEAM STEERING IN A TEMPERATURE MONITORING NETWORK

PRIORITY CLAIM

The present application claims the benefit of priority of U.S. Provisional Application Ser. No. 63/070,634, titled "Self Temperature Calibrating Sensor and Network," filed on Aug. 26, 2020, which is incorporated herein by reference.

FIELD

The present disclosure relates generally to temperature sensor assemblies and/or temperature sensor networks for monitoring temperature(s) of a plurality of users.

BACKGROUND

Temperature measurement can be a first-line screening technique for many medical conditions. Temperature measurement has especially risen to prominence for rapid screening of populations during virus outbreaks. Contactless screening is critical for preventing the spread of viruses to healthcare workers, caregivers, workplace monitoring staff, and many other individuals. Infrared screening is currently the most popular choice, but suffers from consistency issues. For instance, IR screening requires verification, especially if detecting a fever, results in a loss of work time, more extensive testing, contact tracing, etc. Verifying a temperature measurement typically involves some contact to the individual, which can contribute to viral spread. Thus, limiting contact to obtain and/or verify temperature measurement can be desirable.

SUMMARY

Aspects and advantages of embodiments of the present disclosure will be set forth in part in the following description, or may be learned from the description, or may be learned through practice of the embodiments.

A temperature sensor assembly can include a first temperature sensor that can be configured to obtain a first temperature measurement of a user. The temperature sensor assembly can further include a second temperature sensor that can be configured to obtain a second temperature measurement of the user. The temperature sensor assembly can further include one or more processors that can be configured to determine a third temperature measurement indicative of a temperature of the user based at least in part on the first temperature measurement and the second temperature measurement. The temperature sensor assembly can further include a base station communication antenna system that can include a modal antenna that can be configured to communicate the third temperature measurement with a base station based at least in part on a beam steering operation.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
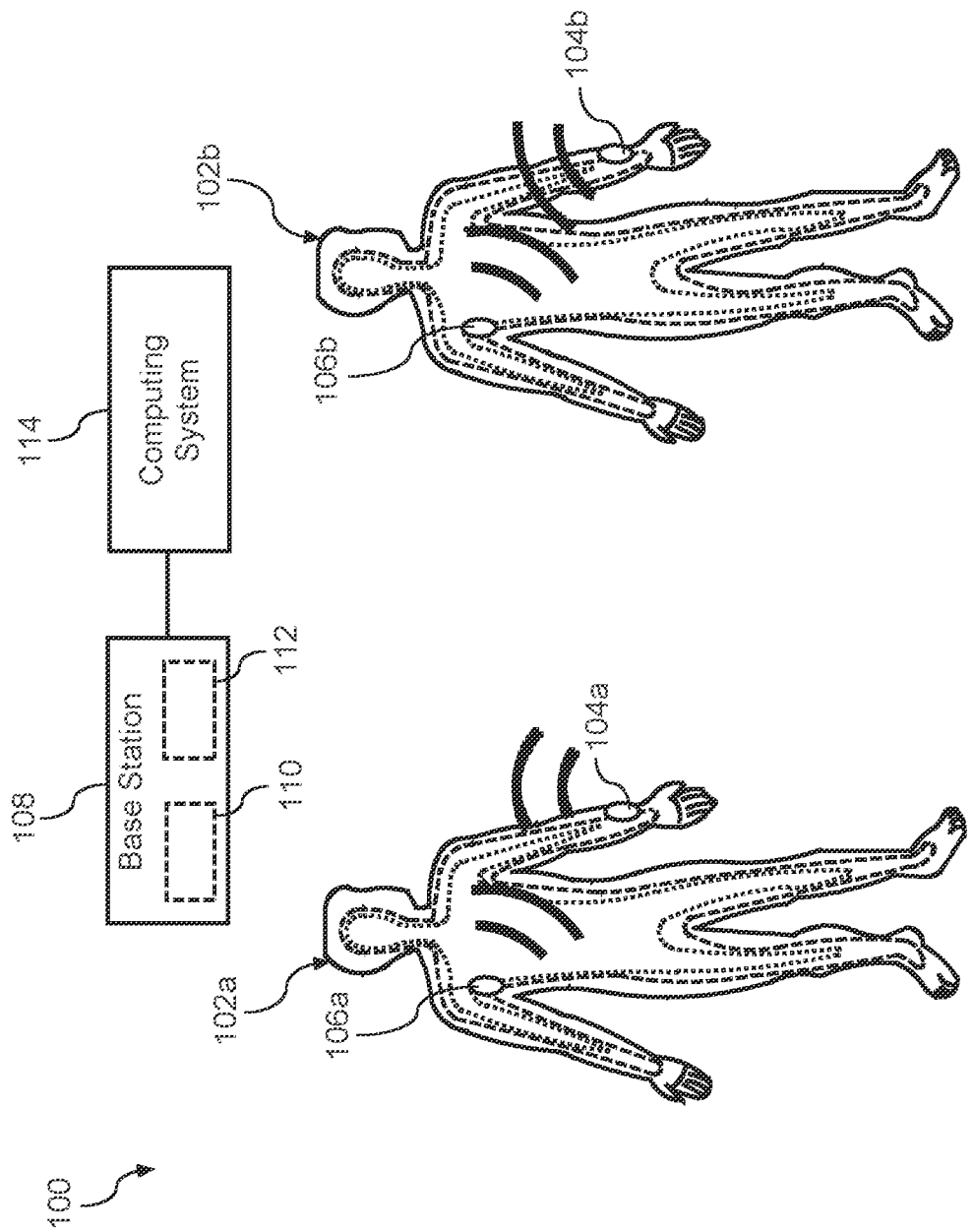
FIG. 1 depicts an example temperature monitoring network according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a temperature monitoring network. Additionally and/or alternatively, example aspects of the present disclosure are directed to a temperature sensor for use in a temperature monitoring network. The temperature monitoring network can include one or more sensors provided at each of a plurality of users. In some cases, the users can live in, work in, and/or otherwise occupy a space that facilitates sickness (e.g., viral) transmission including any suitable viruses or sicknesses. The sensors can be attached to a user and/or monitor temperature of the user at a point at which they are attached to the user. Temperature of a plurality of users can be monitored (e.g., by the sensors) and transmitted to a base station. A computing system at the base station can monitor temperatures (e.g., historical temperature and/or current temperature) of each user.

Additionally and/or alternatively, the computing system can issue a warning if a user is determined to pose a health concern, such as by having a high temperature and/or a highly changing temperature. In some embodiments, the computing system may issue a warning for an affected user and/or the temperature sensor of the affected user can issue a warning, independently and/or coordinated. For example, the temperature sensor can recognize that a temperature measurement is too high and issue a warning locally, without intervention of the computing system. As another example, the computing system can, in addition to issuing a warning at the computing system, transmit a signal to the sensor to cause the sensor to issue the warning. The warning at the sensor can be an audial and/or visual warning, such as a buzzer, light, flashing lights, verbal warning, beeping, or any other suitable warning, and/or combination thereof. In some embodiments, the warnings can be nonaudiovisual alerts, such as emails, text messages, etc. For example, the computing system can provide an email notification, text notification, popup notification, etc. to a computing device of an observing party.

Each user can have one or more associated sensors. Each of the one or more associated sensors can be positioned at a different point around the user's body. For instance, one sensor may be configured to measure temperature of a user's armpit while another may be configured to measure temperature of a user's wrist. The sensors can be positioned at any suitable point around a user's body for which temperature measurements are to be obtained. In some embodiments, the sensors can be disposed in suitable wearable devices, such as garments and/or accessories, that place the sensors against the user, such as shirts, pants, socks, shoes, wristbands and/or armbands, neckbands, and/or any other suitable garments. As another example, the sensors can be adhered to the user, such as to skin of the user.

One of the sensors associated with a user can act as a primary sensor. The remainder of the sensors associated with a user (e.g., a second sensor, third sensor, etc.) can act as secondary sensors. The secondary sensors can obtain temperature measurements and can transmit the temperature measurements to the primary sensor. The primary sensor can aggregate the temperature measurements for transmittal to the base station. For example, the primary sensor can act as a relay of the secondary sensor's temperature measurements to the base station. As another example, the primary sensor can combine some or all of the temperature measurements into a single transmission (e.g., a single packet and/or set of related packets). In some embodiments, the primary sensor can resolve redundant sensor measurements. For example, temperature measurements from corresponding points on a user's body (e.g., left shoulder and right shoulder) can be combined into a single measurement. As another example, the primary sensor can calibrate other sensors with respect to measurements from other sensors.

In some embodiments, only the primary sensors will communicate with the base station. The secondary sensors can communicate with the primary sensor of their associated user and/or with other secondary sensor of the user, while not communicating with the base station. Embodiments where only the primary sensors communicate with the base station can reduce network traffic associated with the temperature monitoring network, which can contribute to reduced interference, increased connection strength, etc. In some embodiments, no secondary sensors are included, and the primary sensor may act alone for a respective user. In some embodiments, a mobile device equipped with NFC-capable hardware and/or software can be used for data collection and transmission.

A sensor associated with a user can communicate with other sensors associated with the user by an intersensor wireless system. The intersensor wireless system can be any suitable wireless communication system, such as, for example, a Bluetooth system, a Bluetooth low-energy (BLE) system, a ZigBee system, a near-field communication (NFC) system, an infrared communication system, and/or any other suitable communication system. The intersensor wireless system can be used to transmit information between secondary sensors and/or between a primary and secondary sensor. For example, the intersensor wireless system can be used to transmit temperature measurements from a secondary sensor to a primary sensor. Near field communication can be inexpensive, energy efficient and/or compact for such applications.

Additionally, a sensor (e.g., a primary sensor) can communicate with a base station by a base station communication antenna system. For instance, in some embodiments, the base station communication antenna system can include a modal antenna, such as a beam- and/or null-steering antenna. For instance, the modal antenna can be configured to steer one or more nulls and/or nodes in a radiation pattern. As one example, the modal antenna can include one or more parasitic elements that can be tuned to adjust a radiation pattern of the modal antenna. Including temperature sensors having at least one modal antenna capable of null steering in a temperature monitoring network can contribute to reduced interference and/or improved capacity of the network. For example, the temperature sensors can be configured to steer nulls to prevent interference with other sensors, which can allow for a greater number of temperature sensors (e.g., primary sensors) to be employed in an area. This can, in turn, allow for a greater number of users to be serviced by the temperature monitoring network, thus providing improved temperature monitoring and user safety.

In some embodiments, the sensor can provide for locating the user to which the sensor is attached. For example, one or more sensors on the user (e.g., each sensor and/or the primary sensor) can include a location finding system, such as a satellite positioning system, approximate positioning system (e.g., by wireless triangulation, WiFi connectivity, base station connectivity, etc.), and/or other suitable finding system such that a user can be located in the event of a health hazard.

As used herein, terms of approximation, such as "approximately," "substantially," and/or "about," refer to being within a 10 percent (%) margin of error of the stated value. As referenced herein, the terms "or" and "and/or" are generally intended to be inclusive (that is (i.e.), "A or B" or "A and/or B" are each intended to mean "A or B or both"). As referred to herein, the terms "first," "second," "third," etc. can be used interchangeably to distinguish one component from another and are not intended to signify location or importance of the individual components.

As used herein, the terms "couple," "couples," "coupled," and/or "coupling" refer to chemical coupling (e.g., chemical bonding), communicative coupling, electrical and/or electromagnetic coupling (e.g., capacitive coupling, inductive coupling, direct and/or connected coupling, etc.), mechanical coupling, operative coupling, optical coupling, physical coupling, and/or thermal coupling. As referenced herein, the term "entity" refers to a human, a user, an end-user, a consumer, a computing device and/or program (e.g., a processor, computing hardware and/or software, an application, etc.), an agent, a machine learning (ML) and/or artificial intelligence (AI) algorithm, model, system, and/or application, and/or another type of entity that can implement one or more embodiments of the present disclosure as described herein, illustrated in the accompanying drawings, and/or included in the appended claims.

FIG. 1 depicts an example temperature monitoring network according to example embodiments of the present disclosure. FIG. 1 depicts a temperature monitoring network for two users. One of ordinary skill in the art will understand that any suitable number of users, including greater than 100 users, scan be included in a temperature monitoring network according to example aspects of the present disclosure. Each user can have a primary sensor and a secondary sensor configured to obtain temperature measurements from the user. As depicted in FIG. 1, the sensors on the arms of the users act as primary sensors in communication with a base station, and the sensors at the armpits of the users act as secondary sensors in communication with the primary sensors. FIG. 1 depicts a single secondary sensor for each user. It should be understood that each user can have any suitable number of secondary sensors. Generally, one primary sensor is associated with each user. The secondary sensors can obtain temperature measurements and transmit (e.g., by NFC), the temperature measurements to the primary sensors, which can then transmit the temperature measurements (e.g., along with temperature measurements obtained by the primary sensors) to the base station. A computing system coupled to the base station can monitor temperatures (e.g., historical temperature and/or current temperature) of each user in the temperature monitoring network. For example, the computing system can provide aggregated data for a plurality of users in the network to an observing user, such as a medical professional, a service that monitors for unexpected changes in temperature and/or abnormal temperatures, and/or other suitable data recipients.

FIG. 1 depicts a diagram of an example, non-limiting temperature monitoring network 100 according to example embodiments of the present disclosure. The example embodiment illustrated in FIG. 1 depicts a temperature monitoring network 100 that can include one or more users 102a, 102b. One of ordinary skill in the art will understand that any number of users 102a, 102b (e.g., greater than 100 users 102a, 102b) can be included in temperature monitoring network 100 according to example aspects of the present disclosure.

In various example embodiments of the present disclosure, a primary temperature sensor assembly 104a, 104b and/or a secondary temperature sensor assembly 106a, 106b can be respectively coupled to user 102a, 102b. For example, as illustrated in the example embodiment depicted in FIG. 1, primary temperature sensor assembly 104a and secondary temperature sensor assembly 106a can be coupled (e.g., adhered) to user 102a and primary temperature sensor assembly 104b and secondary temperature sensor assembly 106b can be coupled (e.g., adhered) to user 102b.

In various example embodiments of the present disclosure, each primary temperature sensor assembly 104a, 104b and each secondary temperature sensor assembly 106a, 106b can be configured to respectively obtain a body temperature measurement of user 102a, 102b and an ambient temperature measurement of user 102a, 102b. For instance, in the example embodiment depicted in FIG. 1, primary temperature sensor assembly 104a and secondary temperature sensor assembly 106a can be configured to respectively obtain a body temperature measurement of user 102a and an ambient temperature measurement of user 102a. In this example embodiment, primary temperature sensor assembly 104b and secondary temperature sensor assembly 106b can be configured to respectively obtain a body temperature measurement of user 102b and an ambient temperature measurement of user 102b.

According to example embodiments of the present disclosure, primary temperature sensor assembly 104a, primary temperature sensor assembly 104b, secondary temperature sensor assembly 106a, and/or secondary temperature sensor assembly 106b can each be configured to determine (e.g., calculate) a corrected temperature measurement of each user 102a, 102b based at least in part on a body temperature measurement and an ambient temperature measurement of each user 102a, 102b. Such a corrected temperature measurement according to example embodiments of the present disclosure can constitute and/or be indicative of a temperature of a user 102a, 102b (e.g., an absolute and/or core temperature measurement of user 102a or user 102b). In these example embodiments, the corrected temperature measurement can compensate an effect of an ambient temperature measurement of a user 102a, 102b on a body temperature measurement of a user 102a, 102b, as the ambient temperature about a user 102a, 102b can affect the body temperature measurement of user 102a, 102b.

In some example embodiments of the present disclosure, primary temperature sensor assembly 104a, primary temperature sensor assembly 104b, secondary temperature sensor assembly 106a, and/or secondary temperature sensor assembly 106b can be configured to employ and/or execute a correlation function (e.g., a lookup table, mathematical function, formula, and/or model, an algorithm, etc.) to determine the above-described corrected temperature measurement of each user 102a, 102b based at least in part on a body temperature measurement and an ambient temperature measurement of each user 102a, 102b. For instance, in these embodiments, primary temperature sensor assembly 104a, primary temperature sensor assembly 104b, secondary temperature sensor assembly 106a, and/or secondary temperature sensor assembly 106b can include and/or be coupled to a computer-readable memory that can be configured to store such a correlation function. In some example embodiments, such a computer-readable memory can include and/or be provided with the same structure and/or functionality as that of computer-readable memory 312 described below and illustrated in the example embodiment depicted in FIG. 3. In these example embodiments, primary temperature sensor assembly 104a, primary temperature sensor assembly 104b, secondary temperature sensor assembly 106a, and/or secondary temperature sensor assembly 106b can further include one or more processors (e.g., microprocessor(s)) that can be configured to employ and/or execute the correlation function to determine the corrected temperature measurement of each user 102a, 102b based at least in part on a body temperature measurement and an ambient temperature measurement of each user 102a, 102b. For instance, in these embodiments, such processor(s) can use the respective body temperature measurement and ambient temperature measurement of each user 102a, 102b as input to the correlation function, where the output of the correlation function can constitute and/or include the above-described corrected temperature measurement of each user 102a, 102b. In some example embodiments, such processor(s) can include and/or be provided with the same structure and/or functionality as that of processor(s) 310 described below and illustrated in the example embodiment depicted in FIG. 3.

As illustrated in the example embodiment depicted in FIG. 1, primary temperature sensor assemblies 104a, 104b can be respectively coupled (e.g., adhered) to an arm of users 102a, 102b and secondary temperature sensor assemblies 106a, 106b can be respectively coupled (e.g., adhered) to the chest and/or an armpit of users 102a, 102b. In various example embodiments of the present disclosure, a single primary temperature sensor assembly 104a, 104b can be respectively coupled (e.g., adhered) to users 102a, 102b.

Although the example embodiment illustrated in FIG. 1 depicts a single secondary temperature sensor assembly 106a, 106b respectively coupled (e.g., adhered) to users 102a, 102b, it should be appreciated that any number of secondary temperature sensor assemblies 106a, 106b can be respectively coupled to users 102a, 102b.

According to example embodiments of the present disclosure, secondary temperature sensor assemblies 106a, 106b can each function as a secondary temperature sensor assembly that can be in communication with primary temperature sensor assemblies 104a, 104b, respectively. In these example embodiments, secondary temperature sensor assemblies 106a, 106b can be configured to respectively communicate (e.g., via a near-field communication (NFC) protocol) one or more temperature measurements of users 102a, 102b with primary temperature sensor assemblies 104a, 104b, respectively. For instance, in these example embodiments, secondary temperature sensor assemblies 106a, 106b can be configured to respectively communicate (e.g., via an NFC protocol) one or more body temperature measurements, one or more ambient temperature measurements, and/or one or more corrected temperature measurements of users 102a, 102b with primary temperature sensor assemblies 104a, 104b, respectively. For example, in the example embodiment depicted in FIG. 1, secondary temperature sensor assembly 106a can be configured to transmit (e.g., via an NFC protocol) such one or more temperature measurements of user 102a to primary temperature sensor assembly 104a, and/or secondary temperature sensor assembly 106b can be configured to transmit (e.g., via an NFC protocol) such one or more temperature measurements of user 102b to primary temperature sensor assembly 104b.

In some example embodiments, primary temperature sensor assembly 104a, primary temperature sensor assembly 104b, secondary temperature sensor assembly 106a, and/or secondary temperature sensor assembly 106b can be configured to store one or more body temperature measurements, one or more ambient temperature measurements, and/or one or more corrected temperature measurements of user 102a and/or user 102b on a computer-readable memory that can be included in and/or coupled to each of such temperature sensor assemblies. For instance, in some example embodiments, primary temperature sensor assembly 104a, primary temperature sensor assembly 104b, secondary temperature sensor assembly 106a, and/or secondary temperature sensor assembly 106b can be configured to store one or more of the above-described temperature measurements of user 102a and/or user 102b on computer-readable memory 312 that can be included in and/or coupled to each of such temperature sensor assemblies as described below with reference to FIG. 3.

According to example embodiments of the present disclosure, primary temperature sensor assemblies 104a, 104b can each function as a primary temperature sensor assembly that can be in communication with a base station 108. In these example embodiments, primary temperature sensor assemblies 104a, 104b can be configured to respectively communicate (e.g., via a far-field communication protocol) one or more temperature measurements of users 102a, 102b with base station 108. For instance, in these example embodiments, primary temperature sensor assemblies 104a, 104b can be configured to respectively communicate (e.g., via a far-field communication protocol) one or more body temperature measurements, and/or one or more corrected temperature measurements of users 102a, 102b with base station 108, where such temperature measurements can be obtained and/or determined by primary temperature sensor assembly 104a, primary temperature sensor assembly 104b, secondary temperature sensor assembly 106a, and/or secondary temperature sensor assembly 106b. For example, in the example embodiment depicted in FIG. 1, primary temperature sensor assembly 104a can be configured to transmit (e.g., via a far-field communication protocol) such one or more temperature measurements of user 102a to base station 108, and/or primary temperature sensor assembly 104b can be configured to transmit (e.g., via a far-field communication protocol) such one or more temperature measurements of user 102b to base station 108.

In some example embodiments, primary temperature sensor assembly 104a and/or primary temperature sensor assembly 104b can be configured to periodically (e.g., at defined intervals of time) transmit (e.g., via a far-field communication protocol) such one or more temperature measurements of user 102a and/or user 102b, respectively, to base station 108. In some example embodiments, primary temperature sensor assembly 104a and/or primary temperature sensor assembly 104b can be configured to continuously (e.g., contiguously, in real-time) transmit (e.g., via a far-field communication protocol) such one or more temperature measurements of user 102a and/or user 102b, respectively, to base station 108.

Base station 108 according to example embodiments of the present disclosure can include one or more processors 110 (e.g., microprocessor(s)) and/or a computer-readable memory 112. In some example embodiments, computer-readable memory 112 can be configured to store one or more computer-executable components (e.g., program code, instructions, processing threads, etc.) and/or one or more processors 110 can be configured to execute such computer-executable component(s). In some embodiments, base station 108 can include and/or be provided as a wireless access point (WAP) device and/or a beacon device. In some embodiments, base station 108 can be configured to communicate (e.g., via a far-field communication protocol) one or more signals (e.g., radiofrequency (RF) signals) with primary temperature sensor assembly 104a, primary temperature sensor assembly 104b, secondary temperature sensor assembly 106a, and/or secondary temperature sensor assembly 106b. For instance, in some embodiments, base station 108 can be configured to transmit (e.g., via a far-field communication protocol) a signal to primary temperature sensor assembly 104a, primary temperature sensor assembly 104b, secondary temperature sensor assembly 106a, and/or secondary temperature sensor assembly 106b, where such a signal can be associated with a warning (e.g., a warning notification) indicating that at least one temperature measurement of user 102a and/or user 102b exceeds a defined temperature measurement threshold.

To facilitate such communication of one or more signals (e.g., RF signal(s)) with primary temperature sensor assembly 104a, primary temperature sensor assembly 104b, secondary temperature sensor assembly 106a, and/or secondary temperature sensor assembly 106b, base station 108 according to example embodiments of the present disclosure can include a modal antenna that can perform a beam steering operation. For example, base station 108 according to example embodiments of the present disclosure can include a modal antenna, such as modal antenna 1410 described below and illustrated in the example embodiment depicted in FIG. 7. In these example embodiments, such a modal antenna (e.g., model antenna 1410) and/or base station 108 can be configured to perform a beam steering operation. To perform such a beam steering operation, base station 108 and/or such a modal antenna (e.g., modal antenna 1410) according to example embodiments of the present disclosure can be configured to provide a radiation pattern and/or to steer one or more nulls and/or one or more nodes of such a radiation pattern. For example, base station 108 and/or such a modal antenna (e.g., modal antenna 1410) according to example embodiments of the present disclosure can be configured to: steer one or more nulls of the radiation pattern in a first direction toward one or more first temperature sensor assemblies (e.g., secondary temperature sensor assembly 106a or secondary temperature sensor assembly 106b); and/or steer one or more nodes of the radiation pattern in a second direction toward one or more second temperature sensor assemblies (e.g., primary temperature sensor assembly 104a or primary temperature sensor assembly 104b). In various example embodiments of the present disclosure, such a modal antenna (e.g., model antenna 1410) and/or base station 108 can be configured to perform a beam steering operation as described above that can reduce signal interference associated with a signal communicated by such a modal antenna, increase signal strength of the signal, and/or improve capacity of a network (e.g., temperature monitoring network 100).

As illustrated in the example embodiment depicted in FIG. 1, base station 108 can be coupled (e.g., via a wired and/or wireless communication protocol) to a computing system 114 (e.g., a computer, a server, a processor, a mobile computing and/or communication device, etc.). Computing system 114 according to example embodiments of the present disclosure can be configured to monitor and/or store temperature measurements (e.g., historical and/or current body temperature measurements and/or ambient temperature measurements) of each user 102a, 102b in temperature monitoring network 100. In some embodiments, computing system 114 can be configured to provide aggregated data of users 102a, 102b to an observing entity and/or a data receiving entity, such as a medical professional, a service that monitors for unexpected changes in temperature and/or abnormal temperatures, and/or another entity.

In some example embodiments of the present disclosure, computing system 114 can be configured to determine that a temperature measurement of a user 102a, 102b exceeds a defined temperature measurement threshold. For instance, in the example embodiment depicted in FIG. 1, computing system 114 can be configured to determine (e.g., via a lookup table, an index, etc.) that a corrected temperature measurement of user 102a and/or user 102b (e.g., as determined by primary temperature sensor assembly 104a, primary temperature sensor assembly 104b, secondary temperature sensor assembly 106a, and/or secondary temperature sensor assembly 106b) exceeds a defined temperature measurement threshold (e.g., 99 degrees Fahrenheit (° F.), 100° F., 101° F., etc.). Based on such a determination, computing system 114 in accordance with example embodiments of the present disclosure can be configured to communicate a warning (e.g., warning notification) indicating that such a temperature measurement of user 102a and/or user 102b exceeds such a defined temperature measurement threshold. For instance, in some example embodiments, computing system 114 can be configured to issue an audio and/or visual warning (e.g., a buzzer, light, flashing lights, verbal warning, beeping, or another warning, and/or combination thereof) via, for example, one or more data output devices of computing system 114 (e.g., a monitor, speaker, light source, etc.). In some example embodiments, computing system 114 can be configured to provide (e.g., transmit via a wired and/or wireless communication protocol) a non-audiovisual warning (e.g., an e-mail message, text message, popup notification, etc.) to a mobile device (e.g., smart phone, laptop, etc.) that can be associated with such one or more observing and/or data receiving entities defined above.

Additionally, or alternatively, in some embodiments, computing system 114 can be configured to transmit (e.g., via a wired and/or wireless communication protocol) the above-described warning in the form of one or more signals (e.g., RF signal(s)) to primary temperature sensor assembly 104a, primary temperature sensor assembly 104b, secondary temperature sensor assembly 106a, secondary temperature sensor assembly 106b, and/or base station 108. For example, in some example embodiments, base station 108 can be configured to transmit (e.g., via a far-field communication protocol) such one or more signals with primary temperature sensor assembly 104a, primary temperature sensor assembly 104b, secondary temperature sensor assembly 106a, and/or secondary temperature sensor assembly 106b. In these example embodiments, such one or more signals can cause primary temperature sensor assembly 104a, primary temperature sensor assembly 104b, secondary temperature sensor assembly 106a, and/or secondary temperature sensor assembly 106b to issue the above-described warning based on receipt of such signal(s) from base station 108. In some example embodiments, computing system 114 can be configured to transmit (e.g., via a wired and/or wireless communication protocol) such signal(s) directly to primary temperature sensor assembly 104a, primary temperature sensor assembly 104b, secondary temperature sensor assembly 106a, and/or secondary temperature sensor assembly 106b. In these example embodiments, upon receipt of such signal(s) from computing system 114, such signal(s) can cause one or more of such temperature sensor assemblies to issue the above-described warning.

To issue the above-described warning, in some example embodiments of the present disclosure, primary temperature sensor assembly 104a, primary temperature sensor assembly 104b, secondary temperature sensor assembly 106a, and/or secondary temperature sensor assembly 106b can include and/or be coupled to one or more data output devices that can be configured to issue the above-described warning in the form of an audio and/or visual warning (e.g., a buzzer, light, flashing lights, verbal warning, beeping, or another warning, and/or combination thereof). For instance, in these example embodiments, primary temperature sensor assembly 104a, primary temperature sensor assembly 104b, secondary temperature sensor assembly 106a, and/or secondary temperature sensor assembly 106b can include and/or be coupled to a display, a screen, a speaker, a light source, and/or another data output device that can be configured to issue the above-described warning in the form of an audio and/or visual warning.

Additionally, or alternatively, in some example embodiments, primary temperature sensor assembly 104a, primary temperature sensor assembly 104b, secondary temperature sensor assembly 106a, and/or secondary temperature sensor assembly 106b can be configured to issue the above-described warning based on a determination (e.g., via a lookup table, an index, etc.) by one or more of such temperature sensor assemblies that a corrected temperature measurement of user 102a and/or 102b exceeds a defined temperature measurement threshold (e.g., 99 degrees Fahrenheit (° F.), 100° F., 101° F., etc.). For instance, in these example embodiments, primary temperature sensor assembly 104a, primary temperature sensor assembly 104b, secondary temperature sensor assembly 106a, and/or secondary temperature sensor assembly 106b can include a computer-readable memory that can be configured to store one or more computer-readable components, such as a lookup table and/or an index of defined temperature measurement thresholds. In these example embodiments, primary temperature sensor assembly 104a, primary temperature sensor assembly 104b, secondary temperature sensor assembly 106a, and/or secondary temperature sensor assembly 106b can further include one or more processors (e.g., microprocessor(s)) that can be configured to reference such computer-readable components to determine whether a corrected temperature measurement of user 102a and/or user 102b exceeds a defined temperature measurement threshold. In these example embodiments, based on a determination that a temperature measurement of user 102a and/or user 102b exceeds such a defined temperature measurement threshold, primary temperature sensor assembly 104a, primary temperature sensor assembly 104b, secondary temperature sensor assembly 106a, and/or secondary temperature sensor assembly 106b can be configured to issue (e.g., locally) the above-described warning. For instance, in these example embodiments, primary temperature sensor assembly 104a, primary temperature sensor assembly 104b, secondary temperature sensor assembly 106a, and/or secondary temperature sensor assembly 106b can be configured to issue an audio and/or visual warning (e.g., a buzzer, light, flashing lights, verbal warning, beeping, or another warning, and/or combination thereof).

Figure 2:
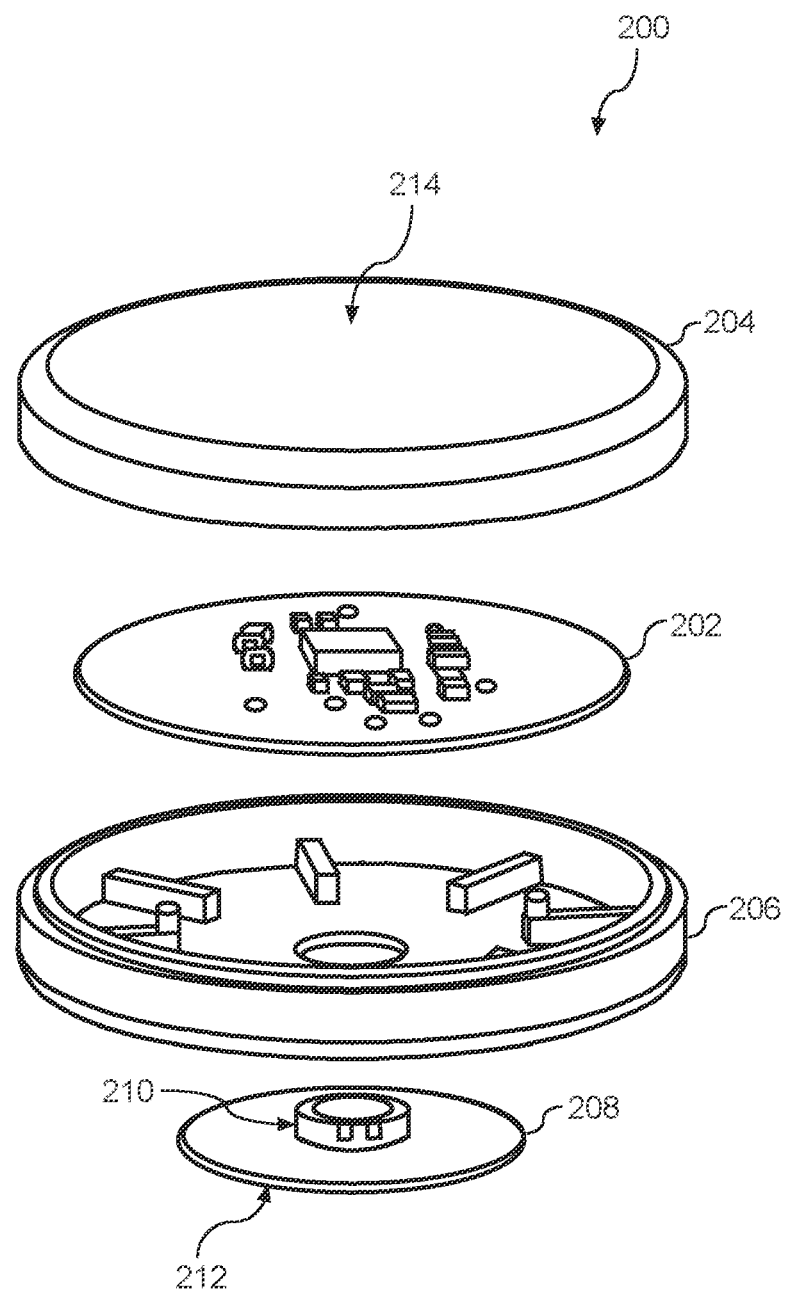
FIG. 2 depicts an example temperature sensor according to example embodiments of the present disclosure.

FIG. 2 depicts an example temperature sensor assembly according to example embodiments of the present disclosure. The sensor assembly can include a circuit board that is disposed between a top plate and a bottom plate. The top plate and/or bottom plate can be fastened together by glue, clamps, twist-and-lock, screws, threading, clasps, and/or by any other suitable fastening systems. A metal pad can extend through the bottom plate to the circuit board and contact a user and/or an area proximate a user. The metal pad can transfer heat from the user to a temperature sensor at the circuit board. The sensor assembly can be made small enough such that it is unobtrusive to the user.

In some embodiments, the sensor can be powered by NFC power. For instance, in some embodiments, an NFC sensor package can be powered by the reading circuit, which can provide for brief, single point measurements without requiring the sensors to maintain a battery and/or provide access to a battery. As an example, in some implementations, thermistor sensors combined with NFC power/logic devices can be fashioned into packages for probe (oral, etc.) and/or patch (skin surface) temperature measurement.

Additionally and/or alternatively, in some embodiments, the sensor can be battery powered. Providing a battery at the circuit board can allow for a stream of continual measurements to be taken. The continual measurements can be taken in bursts (e.g., short bursts for monitoring purposes) and/or longer streams (e.g., continuously) for continuous local monitoring. In some embodiments, the data can be uploaded periodically, such as periodically depending on data storage capacities at the sensors. In some embodiments, the battery can be a replaceable battery, such as a coin cell and/or other configuration. Additionally and/or alternatively, the battery can be a rechargeable battery. In some embodiments, a charging port could be provided for wired charging of the rechargeable battery. Additionally and/or alternatively, an NFC antenna can also be used for wireless charging of the rechargeable battery in accordance with a wireless charging standard.

FIG. 2 depicts an exploded view of an example, non-limiting temperature sensor assembly 200 according to example embodiments of the present disclosure. According to example embodiments of the present disclosure, temperature sensor assembly 200 can include and/or be provided with the same components and/or functionality as that of primary temperature sensor assembly 104a, primary temperature sensor assembly 104b, secondary temperature sensor assembly 106a, and/or secondary temperature sensor assembly 106b described above with reference to the example embodiment depicted in FIG. 1.

Temperature sensor assembly 200 according to various example embodiments of the present disclosure can include a circuit board 202 (e.g., a printed circuit board (PCB)) that can be disposed between a top plate 204 and a bottom plate 206. Although not annotated in FIG. 2, circuit board 202 can include one or more temperature sensors (e.g., a body temperature sensor and/or ambient temperature sensor), a computer-readable memory, one or more processors, a wireless system, and/or one or more antennae. For instance, as described below with reference to the example embodiment depicted in FIG. 3, circuit board 202 according to various embodiments of the present disclosure can include body temperature sensor 304, ambient temperature sensor 308, computer-readable memory 312, processor(s) 310, wireless system 314, intersensory wireless system 316, and/or base station communication antenna system 318.

In example embodiments of the present disclosure, top plate 204 and bottom plate 206 can be coupled to one another. In one example embodiment, top plate 204 and bottom plate 206 can be fastened together by, for instance, glue, clamps, twist-and-lock, screws, threading, clasps, and/or by another fastening material, component, system, and/or method.

In example embodiments of the present disclosure, temperature sensor assembly 200 can further include a pad 208 (e.g., a metal pad, plastic pad, etc.) that can be coupled to bottom plate 206 and/or circuit board 202. For instance, in one example embodiment, pad 208 can include a section 210 (e.g., a projected section) that can extend through bottom plate 206 and be coupled to circuit board 202. In this example embodiment, section 210 can extend through bottom plate 206 and be coupled to a first temperature sensor (not illustrated in FIG. 2) that can be disposed on circuit board 202. For instance, in one example embodiment, section 210 can be coupled to body temperature sensor 304 described below and illustrated in the example embodiment depicted in FIG. 3. As illustrated in the example embodiment depicted in FIG.2, pad 208 can further include a section 212 (e.g., a flat, disk-shaped section) that can be coupled (e.g., adhered) to an entity, such as user 102a or user 102b. In some embodiments, section 212 can be coupled to an area proximate an entity, such as an area proximate user 102a or user 102b. According to example embodiments of the present disclosure, pad 208 can be formed using a thermally conductive material such that pad 208 can transfer heat from an entity (e.g., user 102a or user 102b) to the above-described first temperature sensor (e.g., body temperature sensor 304) that can be disposed on circuit board 202.

In example embodiments of the present disclosure, top plate 204 can include a pad 214 (e.g., a metal pad, plastic pad, etc.) that can be exposed and/or coupled (e.g., thermally) to an ambient environment (e.g., air, water, etc.) about an entity (e.g., user 102a or user 102b) to whom temperature sensor assembly 200 can be coupled. In these example embodiments, pad 214 can include a section (e.g., a projected section, not illustrated in FIG. 2) that can be coupled to circuit board 202. In some example embodiments, such a section of pad 214 can be coupled to a second temperature sensor (not illustrated in FIG. 2) that can be disposed on circuit board 202. For instance, in one example embodiment, such a section of pad 214 can be coupled to ambient temperature sensor 308 described below and illustrated in the example embodiment depicted in FIG. 3. According to example embodiments of the present disclosure, top plate 204 and/or pad 214 can be formed using a thermally conductive material such that top plate 204 and/or pad 214 can transfer heat from an ambient environment (e.g., air, water, etc.) about an entity (e.g., user 102a or user 102b) to the above-described second temperature sensor (e.g., ambient temperature sensor 308) that can be disposed on circuit board 202.

In some example embodiments, temperature sensor assembly 200 can be powered by NFC power. For instance, although not illustrated in the example embodiment depicted in FIG. 2, in some example embodiments, temperature sensor assembly 200 and/or circuit board 202 can include an NFC sensor package and/or a reading circuit, where the reading circuit can be coupled to and/or provide power to the NFC sensor package. In these example embodiments, the NFC sensor package can provide for brief, single point measurements to be obtained (e.g., captured) by temperature sensor assembly 200, thereby providing a temperature sensor assembly 200 absent a battery and/or associated components and/or circuitry to maintain and/or access such a battery.

In additional and/or alternative example embodiments, temperature sensor assembly 200 can be battery powered by a battery (not illustrated in FIG. 2) that can be disposed on circuit board 202. Providing such a battery on circuit board 202 according to example embodiments of the present disclosure can allow for a stream of continual measurements to be taken by temperature sensor assembly 200. In these example embodiments, such continual measurements can be taken intermittently (e.g., single or multiple, intermittent measurements to facilitate periodic, local or global temperature monitoring) and/or continuously (e.g., contiguous measurements to facilitate continuous, local or global temperature monitoring).

In some example embodiments, the above-described battery can be and/or constitute a replaceable battery, such as a coin cell battery and/or another replaceable battery. In additional and/or alternative example embodiments, the above-described battery can be and/or constitute a rechargeable battery. In these example embodiments, temperature sensor assembly 200 can include a charging port that can be coupled to such a rechargeable battery and/or circuit board 202 to provide wired charging of the rechargeable battery. In additional and/or alternative example embodiments, temperature sensor assembly 200 can include an NFC antenna that can be coupled to such a rechargeable battery and/or circuit board 202 to provide wireless charging of the rechargeable battery in accordance with, for instance, a wireless charging standard.

Temperature sensor assembly 200 according to example embodiments of the present disclosure can be fabricated such that it is unobtrusive to an entity (e.g., user 102a or user 102b) to whom it can be coupled. In some example embodiments, temperature sensor assembly 200 can include and/or be provided as a thermistor sensor combined with NFC power and/or logic devices. In these example embodiments, temperature sensor assembly 200, the thermistor sensor, and/or the NFC power and/or logic devices can be fabricated into a package to allow for probe (e.g., oral) and/or patch (e.g., skin surface) temperature measurement.

Figure 3:
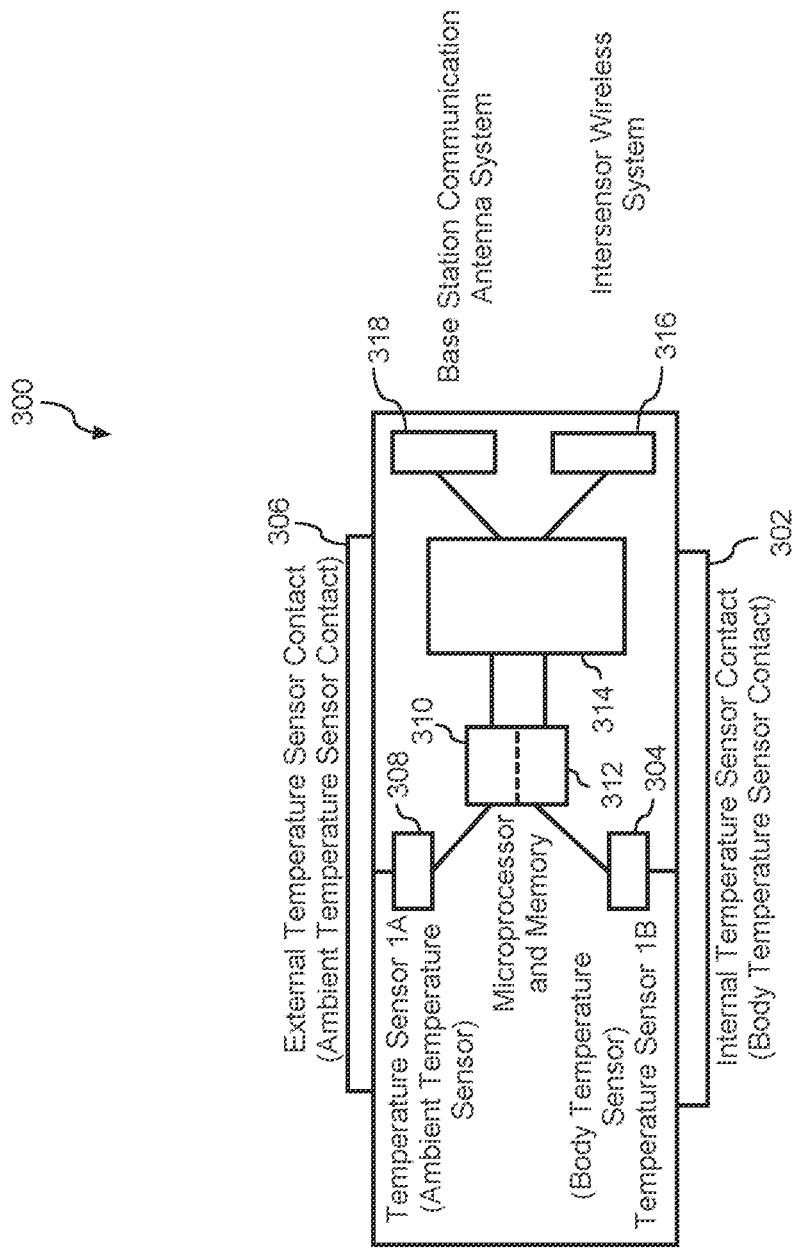
FIG. 3 depicts a block diagram of an example temperature sensor according to example embodiments of the present disclosure.

FIG. 3 depicts a block diagram of an example temperature sensor assembly according to example embodiments of the present disclosure. The temperature sensor assembly can include an internal temperature sensor contact. In some embodiments, the internal temperature sensor contact can be or can include the metal pad discussed with reference to FIG. 2. The internal temperature sensor contact (e.g., a body temperature sensor contact) can contact a surface, skin of a user, etc. and transfer thermal energy from the surface to a body temperature sensor. The body temperature sensor can be configured to obtain a body temperature measurement that is indicative of a (e.g., absolute) body temperature of a user.

Additionally, in some embodiments, the temperature sensor assembly can include an external temperature sensor contact. The external temperature sensor contact (e.g., an ambient temperature sensor contact) can transfer thermal energy from an external surface of the temperature sensor assembly (e.g., a top plate) to the ambient temperature sensor. The external temperature sensor contact may be a top plate of the sensor assembly, such as a plastic top plate. The ambient temperature sensor can be configured to obtain an ambient temperature measurement (e.g., from the external temperature sensor contact) that is indicative of an ambient temperature of a user.

The body temperature of a user can be a strong indication of sickness due to certain viral bodies. However, ambient temperature of a user can impact this temperature measurement, which can present challenges when managing a plurality of users in diverse conditions. Thus, according to example aspects of the present disclosure, each sensor can locally obtain a body temperature measurement and an ambient temperature measurement. The temperature measurements can be provided to one or more processor(s) (e.g., microprocessor(s)) in the sensor assembly. The processor(s) can determine a corrected temperature measurement that compensates for the effect of ambient temperature on the (e.g., absolute) body temperature measurement. For instance, the corrected temperature measurement can be normalized for a variety of different ambient temperature conditions. The corrected temperature measurement can be determined in accordance with the method of FIG. 4. The corrected temperature measurement can be provided to and/or communicated by a wireless system configured to operate the intersensor wireless system and/or base station communication antenna system, such as depending on if the sensor assembly is operating as a primary and/or a secondary sensor. The intersensor wireless system can be configured to communicate with other sensor assemblies (e.g., a primary sensor). For instance, the intersensor wireless system can be an NFC communication system, such as an NFC antenna. The base station communication antenna system can be configured to communicate with a base station. For example, the base station communication antenna system can include a modal antenna, such as a modal antenna of FIG. 7. The base station communication antenna system can be configured to provide a radiation pattern that optimizes the network for a plurality of users. For example, the base station communication station can steer nulls of the radiation pattern in a direction of other (e.g., primary) sensors and/or steer nodes of the radiation pattern in a direction of the base station to provide reduced interference and/or increased signal strength.

FIG. 3 depicts a block diagram of an example, non-limiting temperature sensor assembly 300 according to example embodiments of the present disclosure. According to example embodiments of the present disclosure, temperature sensor assembly 300 can include and/or be provided with the same components and/or functionality as that of primary temperature sensor assembly 104a, primary temperature sensor assembly 104b, secondary temperature sensor assembly 106a, secondary temperature sensor assembly 106b, and/or temperature sensor assembly 200 described above with reference to the example embodiments depicted in FIGS. 1 and 2.

Temperature sensor assembly 300 according to example embodiments of the present disclosure can include an internal and/or body temperature sensor contact 302. In some example embodiments, internal and/or body temperature sensor contact 302 can include and/or be provided with the same structure, material, and/or functionality as that of pad 208 described above with reference to FIG. 2. In the example embodiment depicted in FIG. 3, internal and/or body temperature sensor contact 302 can be coupled to (e.g., contact) a surface (e.g., skin) of an entity (e.g., user 102a or user 102b) to whom temperature sensor assembly 300 can be coupled. In this example embodiment, internal and/or body temperature sensor contact 302 can be coupled to a body temperature sensor 304 (denoted as "temperature sensor 1B" in FIG. 3) of temperature sensor assembly 300 and can transfer thermal energy from such a surface of the entity to body temperature sensor 304. Body temperature sensor 304 according to example embodiments of the present disclosure can be configured to obtain one or more body temperature measurements that can be indicative of a temperature of an entity to whom temperature sensor assembly 300 can be coupled (e.g., indicative of a temperature of user 102a or user 102b at a location on user 102a or user 102b where temperature sensor assembly 300 is coupled to user 102a or user 102b).

Temperature sensor assembly 300 according to example embodiments of the present disclosure can further include an external and/or ambient temperature sensor contact 306. In some example embodiments, external and/or ambient temperature sensor contact 306 can include and/or be provided with the same structure, material, and/or functionality as that of top plate 204 and/or pad 214 described above with reference to FIG. 2. In the example embodiment depicted in FIG. 3, external and/or ambient temperature sensor contact 306 can be exposed and/or coupled (e.g., thermally) to an ambient environment (e.g., air, water, etc.) about an entity (e.g., user 102a or user 102b) to whom temperature sensor assembly 300 can be coupled. In this example embodiment, external and/or ambient temperature sensor contact 306 can be coupled to an ambient temperature sensor 308 (denoted as "temperature sensor 1A" in FIG. 3) of temperature sensor assembly 300 and can transfer thermal energy from such an ambient environment about the entity to ambient temperature sensor 308. Ambient temperature sensor 308 according to example embodiments of the present disclosure can be configured to obtain one or more ambient temperature measurements that can be indicative of an ambient temperature about an entity to whom temperature sensor assembly 300 can be coupled (e.g., indicative of an ambient temperature about user 102a or user 102b at a location on user 102a or 102b where temperature sensor assembly is coupled to user 102a or user 102b).

The body temperature of an entity (e.g., a human, animal, etc.) can be a strong indication of sickness due to certain viral bodies. However, ambient temperature of an entity (e.g., ambient temperature about an entity) can affect a body temperature measurement obtained (e.g., captured) at a certain location on the entity, which can present challenges when managing a plurality of entities in diverse conditions.

Therefore, according to example embodiments of the present disclosure, temperature sensor assembly 300 can locally obtain one or more body temperature measurements (e.g., via internal and/or body temperature sensor contact 302 and body temperature sensor 304) of an entity (e.g., user 102a or user 102b) and/or one or more ambient temperature measurements (e.g., via external and/or ambient temperature sensor contact 306 and ambient temperature sensor 308) of the entity. In some example embodiments, such temperature measurement(s) can be provided to one or more processors 310 of temperature sensor assembly 300 (e.g., a microprocessor as annotated in FIG. 3) to determine a corrected temperature measurement of the entity as described below.

Processor(s) 310 according to example embodiments of the present disclosure can be configured to determine (e.g., calculate) a corrected temperature measurement of an entity (e.g., user 102a or 102b) to whom temperature sensor assembly 300 can be coupled based at least in part on a body temperature measurement and an ambient temperature measurement of such an entity. As described above with reference to FIG. 1, such a corrected temperature measurement according to example embodiments of the present disclosure can constitute and/or be indicative of a temperature of an entity (e.g., an absolute and/or core temperature measurement of user 102a or user 102b). In these example embodiments, the corrected temperature measurement can compensate an effect of an ambient temperature measurement of the entity on a body temperature measurement of the entity, as the ambient temperature about the entity can affect the body temperature measurement of the entity. In some example embodiments, the corrected temperature measurement can be normalized for a variety of different ambient temperature conditions.

In the example embodiment depicted in FIG. 3, to determine the above-described corrected temperature measurement in accordance with example embodiments of the present disclosure, temperature sensor assembly 300 can include and/or be coupled to a computer-readable memory 312 (denoted as "memory" in FIG. 3) that can be configured to store a correlation function (e.g., a lookup table, mathematical function, formula, and/or model, an algorithm, etc.). In the example embodiment depicted in FIG. 3, processor(s) 310 can be configured to employ and/or execute such a correlation function to determine the corrected temperature measurement of an entity (e.g., user 102a or user 102b) to whom temperature sensor assembly 300 can be coupled based at least in part on a body temperature measurement and an ambient temperature measurement of such an entity. For instance, in this embodiment, processor(s) 310 can use the respective body temperature measurement and ambient temperature measurement of the entity as input to the correlation function, where the output of the correlation function can constitute and/or include the above-described corrected temperature measurement of the entity.

In some example embodiments, computer-readable memory 312 can be configured to store one or more of the above-described temperature measurements that can be obtained and/or determined by temperature sensor assembly 300 (e.g., body temperature measurement(s), ambient temperature measurement(s), and/or corrected temperature measurement(s)). In some example embodiments, computer-readable memory 312 can be configured to store one or more temperature measurements (e.g., body temperature measurement(s), ambient temperature measurement(s), and/or corrected temperature measurement(s)) that can be obtained and/or determined by one or more other temperature sensor assemblies that can be in communication with temperature sensor assembly 300 (e.g., primary temperature sensor assembly 104a, primary temperature sensor assembly 104b, secondary temperature sensor assembly 106a, and/or secondary temperature sensor assembly 106b).

As illustrated in the example embodiment depicted in FIG. 3, temperature sensor assembly 300 can further include a wireless system 314 that can be coupled to processor(s) 310 and/or computer-readable memory 312. According to example embodiments of the present disclosure, wireless system 314 can be configured to communicate one or more temperature measurements (e.g., body temperature measurement(s), ambient temperature measurement(s), and/or corrected temperature measurement(s)) that can be obtained and/or determined by temperature sensor assembly 300 and/or by one or more other temperature sensor assemblies that can be in communication with temperature sensor assembly 300 (e.g., primary temperature sensor assembly 104a, primary temperature sensor assembly 104b, secondary temperature sensor assembly 106a, and/or secondary temperature sensor assembly 106b). For instance, in the example embodiment depicted in FIG. 3, wireless system 314 can be configured to communicate one or more temperature measurements (e.g., body temperature measurement(s), ambient temperature measurement(s), and/or corrected temperature measurement(s)) that can be stored on computer-readable memory 312.

To facilitate such communication of such one or more temperature measurements by wireless system 314, temperature sensor assembly 300 according to example embodiments of the present disclosure can include an intersensor wireless system 316 and/or a base station communication antenna system 318 that can be coupled to wireless system 314. According to example embodiments of the present disclosure, wireless system 314 can be configured to operate intersensor wireless system 316 and/or base station communication antenna system 318, for instance, depending on whether temperature sensor assembly 300 is operating as a primary temperature sensor assembly (e.g., primary temperature sensor assembly 104a or primary temperature sensor assembly 104b) or a secondary temperature sensor assembly (e.g., secondary temperature sensor assembly 106a or secondary temperature sensor assembly 106b).

Intersensor wireless system 316 according to example embodiments of the present disclosure, can be configured to communicate with one or more other temperature sensor assemblies (e.g., primary temperature sensor assembly 104a, primary temperature sensor assembly 104b, secondary temperature sensor assembly 106a, and/or secondary temperature sensor assembly 106b). For instance, in some example embodiments, intersensor wireless system 316 can include and/or be provided as an NFC communication system, such as an NFC antenna that can be configured to communicate (e.g., via an NFC protocol) with such one or more other temperature sensor assemblies. In these example embodiments, intersensor wireless system 316 can be configured to communicate the above-described one or more temperature measurements (e.g., body temperature measurement(s), ambient temperature measurement(s), and/or corrected temperature measurement(s)) that can be obtained and/or determined by temperature sensor assembly 300 and/or by one or more other temperature sensor assemblies that can be in communication with temperature sensor assembly 300 (e.g., primary temperature sensor assembly 104a, primary temperature sensor assembly 104b, secondary temperature sensor assembly 106a, and/or secondary temperature sensor assembly 106b).

Base station communication antenna system 318 according to example embodiments of the present disclosure can be configured to communicate with at least one base station (e.g., base station 108). For instance, in some example embodiments, base station communication antenna system 318 can be configured to communicate the above-described one or more temperature measurements (e.g., body temperature measurement(s), ambient temperature measurement(s), and/or corrected temperature measurement(s)) that can be obtained and/or determined by temperature sensor assembly 300 and/or by one or more other temperature sensor assemblies that can be in communication with temperature sensor assembly 300 (e.g., primary temperature sensor assembly 104a, primary temperature sensor assembly 104b, secondary temperature sensor assembly 106a, and/or secondary temperature sensor assembly 106b). In some example embodiments, base station communication antenna system 318 can communicate such one or more temperature measurements with at least one base station (e.g., bast station 108) based at least in part on a beam steering operation.

To facilitate such communication with at least one base station and/or to perform such a beam steering operation, base station communication antenna system 318 according to example embodiments of the present disclosure can include a modal antenna, such as modal antenna 1410 described below and illustrated in the example embodiment depicted in FIG. 7. In these example embodiments, such a modal antenna (e.g., model antenna 1410) and/or base station communication antenna system 318 can be configured to perform a beam steering operation. To perform such a beam steering operation, base station communication antenna system 318 and/or such a modal antenna (e.g., modal antenna 1410) according to example embodiments of the present disclosure can be configured to provide a radiation pattern and/or to steer one or more nulls and/or one or more nodes of such a radiation pattern. For example, base station communication antenna system 318 and/or such a modal antenna (e.g., modal antenna 1410) according to example embodiments of the present disclosure can be configured to: steer one or more nulls of the radiation pattern in a first direction toward one or more other temperature sensor assemblies (e.g., primary temperature sensor assembly 104a, primary temperature sensor assembly 104b, secondary temperature sensor assembly 106a, and/or secondary temperature sensor assembly 106b); and/or steer one or more nodes of the radiation pattern in a second direction toward one or more base stations (e.g., base station 108). In various example embodiments of the present disclosure, such a modal antenna (e.g., model antenna 1410) and/or base station communication antenna system 318 can be configured to perform a beam steering operation as described above that can reduce signal interference associated with a signal communicated by such a modal antenna, increase signal strength of the signal, and/or improve capacity of a network (e.g., temperature monitoring network 100).

Although not illustrated in FIG. 3, in some example embodiments, temperature sensor assembly 300 can include a circuit board that can include and/or be coupled to one or more components of temperature sensor assembly 300 described above and/or illustrated in FIG. 3. For instance, in some example embodiments, temperature sensor assembly 300 can include circuit board 202 (e.g., a PCB). In these example embodiments, circuit board 202 can include body temperature sensor 304, ambient temperature sensor 308, computer-readable memory 312, processor(s) 310, wireless system 314, intersensor wireless system 316, and/or base station communication antenna system 318, where such component(s) can be disposed on and/or integrated into circuit board 202.

Figure 4:
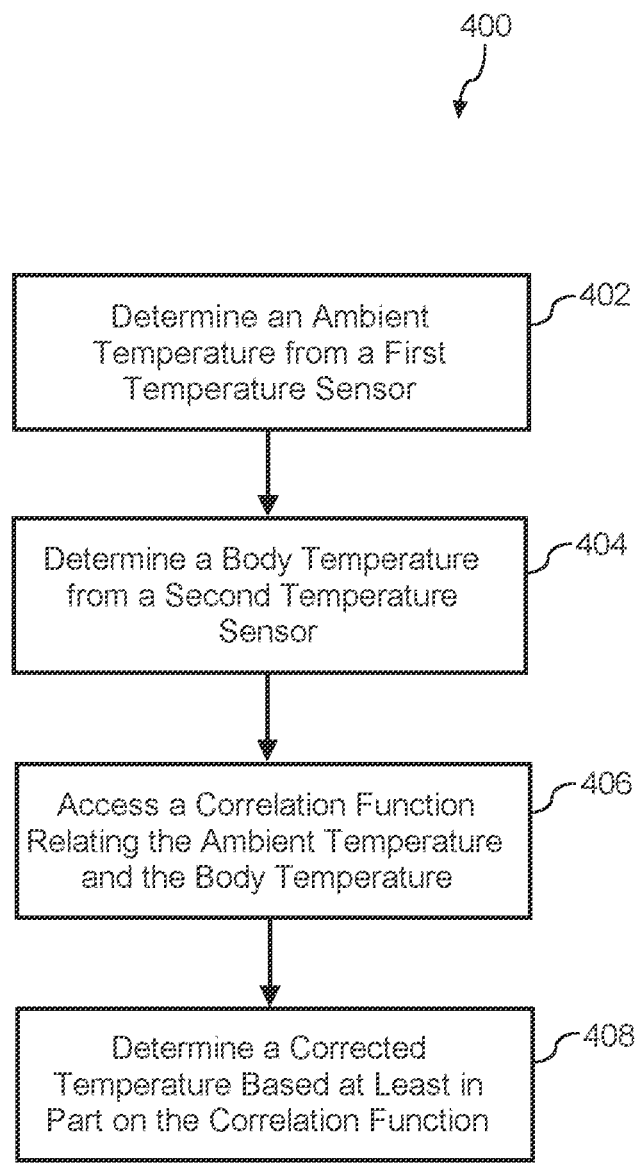
FIG. 4 depicts an example method for obtaining a temperature measurement according to example embodiments of the present disclosure.

FIG. 4 depicts an example method for obtaining a temperature measurement according to example embodiments of the present disclosure. The method may be implemented using, for instance, the sensor assembly discussed above with reference to FIGS. 2-3 (e.g., in a temperature monitoring network as discussed with reference to FIG. 1). FIG. 4 depicts steps performed in a particular order for purposes of illustration and discussion. Those of ordinary skill in the art, using the disclosures provided herein, will understand that various steps of the method may be adapted, modified, rearranged, performed simultaneously or modified in various ways without deviating from the scope of the present disclosure.

The method can include determining an ambient temperature from a first temperature sensor. For example, the first temperature sensor can be an ambient temperature sensor, such as discussed with reference to FIG. 3. The method can include determining a body temperature from a second temperature sensor. For example, the second temperature sensor can be a body temperature sensor, such as discussed with reference to FIG. 3.

The method can include accessing a correlation function relating the ambient temperature and the body temperature. For example, the ambient temperature and the body temperature can be related in that the ambient temperature can affect an absolute reading of the body temperature. The correlation function can be stored in computer-readable memory, and may be or include a look up table, mathematical function, formula, and/or model, and/or may be any other suitable function.

The method can include determining a corrected temperature measurement based at least in part on the correlation function. For example, the correlation function can take the ambient temperature and/or the body temperature as input and produce the corrected temperature measurement as output. The corrected temperature measurement may be calibrated by known behavior of the sensor assembly in different ambient conditions. For example, the function can be calculated once for all sensors and/or calibrated at each sensor.

FIG. 4 depicts a flow chart of an example, non-limiting method 400 that can be implemented to obtain a corrected temperature measurement of an entity according to example embodiments of the present disclosure. Method 400 can be implemented using, for instance, primary temperature sensor assembly 104a, primary temperature sensor assembly 104b, secondary temperature sensor assembly 106a, secondary temperature sensor assembly 106b, temperature sensor assembly 200, and/or temperature sensor assembly 300 described above and illustrated in the example embodiments depicted in FIGS. 1, 2, and 3. In some embodiments, method 400 can be implemented using one or more of such temperature sensor assemblies in, for example, a temperature monitoring network (e.g., temperature monitoring network 100) as described above with reference to FIG. 1.

FIG. 4 depicts steps performed in a particular order for purposes of illustration and discussion. Those of ordinary skill in the art, using the disclosures provided herein, will understand that various steps of the method may be adapted, modified, rearranged, performed simultaneously, removed, and/or modified in various ways without deviating from the scope of the present disclosure.

In the example embodiment depicted in FIG. 4, at 402, method 400 can include determining (e.g., obtaining via external and/or ambient temperature sensor contact 306) an ambient temperature from a first temperature sensor (e.g., ambient temperature sensor 308).

In this example embodiment, at 404, method 400 can include determining (e.g., obtaining via internal and/or body temperature sensor contact 302) a body temperature from a second temperature sensor (e.g., body temperature sensor 304).

In this example embodiment, at 406, method 400 can include accessing (e.g., via processor(s) 310) a correlation function (e.g., a lookup table, mathematical function, formula, and/or model, an algorithm, and/or another function that can be stored on computer-readable memory 312) relating the ambient temperature and the body temperature.

In this example embodiment, at 408, method 400 can include determining (e.g., via processor(s) 310) a corrected temperature measurement based at least in part on the correlation function.

Figure 5:
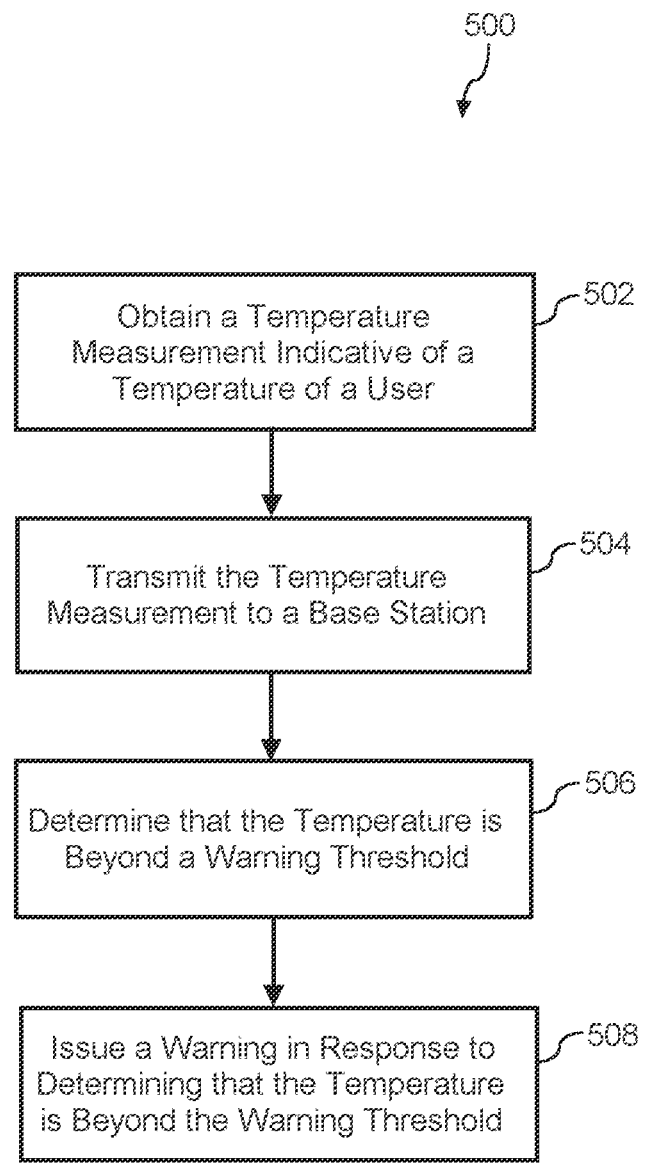
FIG. 5 depicts an example method for monitoring temperature of users according to example embodiments of the present disclosure.

FIG. 5 depicts an example method for monitoring temperature of users according to example embodiments of the present disclosure. The method may be implemented using, for instance, the sensor assembly discussed above with reference to FIGS. 2-3 (e.g., in a temperature monitoring network as discussed with reference to FIG. 1). FIG. 5 depicts steps performed in a particular order for purposes of illustration and discussion. Those of ordinary skill in the art, using the disclosures provided herein, will understand that various steps of the method may be adapted, modified, rearranged, performed simultaneously or modified in various ways without deviating from the scope of the present disclosure.

The method can include obtaining a temperature measurement indicative of a temperature of a user. The temperature measurement can be a body temperature measurement (e.g., from a body temperature sensor) and/or a corrected temperature measurement as discussed with reference to at least FIG. 4. The temperature measurement can be obtained by a sensor assembly, such as the sensor assembly of FIGS. 2-3.

The method can include transmitting the temperature measurement to a base station. For instance, the temperature measurement can be transmitted from a sensor assembly to a base station, such as by a first communication protocol, such as a wireless modal antenna. In some embodiments, the temperature measurement can first be transmitted from a secondary sensor to a primary sensor by a second communication protocol, such as an NFC protocol.

The method can include determining that the temperature of the user is beyond a warning threshold. For example, the temperature may exceed thresholds defining normal human body temperature (e.g., a fever threshold), such as about 99 degrees Fahrenheit. In some embodiments, a plurality of warning thresholds with varying severities (e.g., a high fever threshold of about 102 degrees Fahrenheit) may be employed.

The method can include issuing a warning in response to determining that the temperature is beyond the warning threshold. For example, a warning can be issued to an observing user and/or other medical professional. the computing system can issue a warning if a user is determined to pose a health concern, such as by having a high temperature and/or a highly changing temperature. In some embodiments, As one example, a computing system coupled to the base station may issue a warning for an affected user and/or the temperature sensor of the affected user can issue a warning, independently and/or coordinated. For example, the temperature sensor can recognize that a temperature measurement is too high and issue a warning locally, without intervention of the computing system. As another example, the computing system can, in addition to issuing a warning at the computing system, transmit a signal to the sensor to cause the sensor to issue the warning. The warning at the sensor can be an audial and/or visual warning, such as a buzzer, light, flashing lights, verbal warning, beeping, or any other suitable warning, and/or combination thereof. In some embodiments, different warning thresholds may cause different warnings of varying severity (e.g., increasing severity with increasing temperature). In some embodiments, the warnings can be nonaudiovisual alerts, such as emails, text messages, etc. For example, the computing system can provide an email notification, text notification, popup notification, etc. to a computing device of an observing party.

FIG. 5 depicts a flow chart of an example, non-limiting method 500 that can be implemented to monitor temperatures of one or more entities according to example embodiments of the present disclosure. Method 500 can be implemented using, for instance, primary temperature sensor assembly 104a, primary temperature sensor assembly 104b, secondary temperature sensor assembly 106a, secondary temperature sensor assembly 106b, temperature sensor assembly 200, and/or temperature sensor assembly 300 described above and illustrated in the example embodiments depicted in FIGS. 1, 2, and 3. In some embodiments, method 500 can be implemented using one or more of such temperature sensor assemblies in, for example, a temperature monitoring network (e.g., temperature monitoring network 100) as described above with reference to FIG. 1.

FIG. 5 depicts steps performed in a particular order for purposes of illustration and discussion. Those of ordinary skill in the art, using the disclosures provided herein, will understand that various steps of the method may be adapted, modified, rearranged, performed simultaneously, removed, and/or modified in various ways without deviating from the scope of the present disclosure.

In the example embodiment depicted in FIG. 5, at 502, method 500 can include obtaining (e.g., via primary temperature sensor assembly 104a, primary temperature sensor assembly 104b, secondary temperature sensor assembly 106a, secondary temperature sensor assembly 106b, temperature sensor assembly 200, and/or temperature sensor assembly 300) a temperature measurement indicative of a temperature of a user (e.g., a body temperature measurement and/or a corrected temperature measurement of an entity, such as user 102a or user 102b, as described above with reference to the example embodiments depicted in FIGS. 1, 2, 3, and 4).

In this example embodiment, at 504, method 500 can include transmitting (e.g., via base station communication antenna system 318 and/or modal antenna 1410 as described above with reference to FIG. 3) the temperature measurement to a base station (e.g., base station 108). In some embodiments, method 500 can further include, for instance, transmitting (e.g., via intersensor wireless system 316 using an NFC protocol) the temperature measurement to a primary temperature sensor assembly (e.g., primary temperature sensor assembly 104a and/or primary temperature sensor assembly 104b) prior to transmitting the temperature measurement to the base station as described above at 504 of method 500.

In the example embodiment illustrated in FIG. 5, at 506, method 500 can include determining (e.g., via primary temperature sensor assembly 104a, primary temperature sensor assembly 104b, secondary temperature sensor assembly 106a, secondary temperature sensor assembly 106b, temperature sensor assembly 200, temperature sensor assembly 300, and/or computing system 114 as described above with reference to FIGS. 1, 2, and 3) that the temperature of the user is beyond a warning threshold.

In this example embodiment, at 508, method 500 can include issuing (e.g., via primary temperature sensor assembly 104a, primary temperature sensor assembly 104b, secondary temperature sensor assembly 106a, secondary temperature sensor assembly 106b, temperature sensor assembly 200, temperature sensor assembly 300, and/or computing system 114 as described above with reference to FIGS. 1, 2, and 3) a warning (e.g., a buzzer, light, flashing lights, verbal warning, beeping, an e-mail message, text message, popup notification, etc.) in response to determining that the temperature is beyond the warning threshold.

Figure 6:
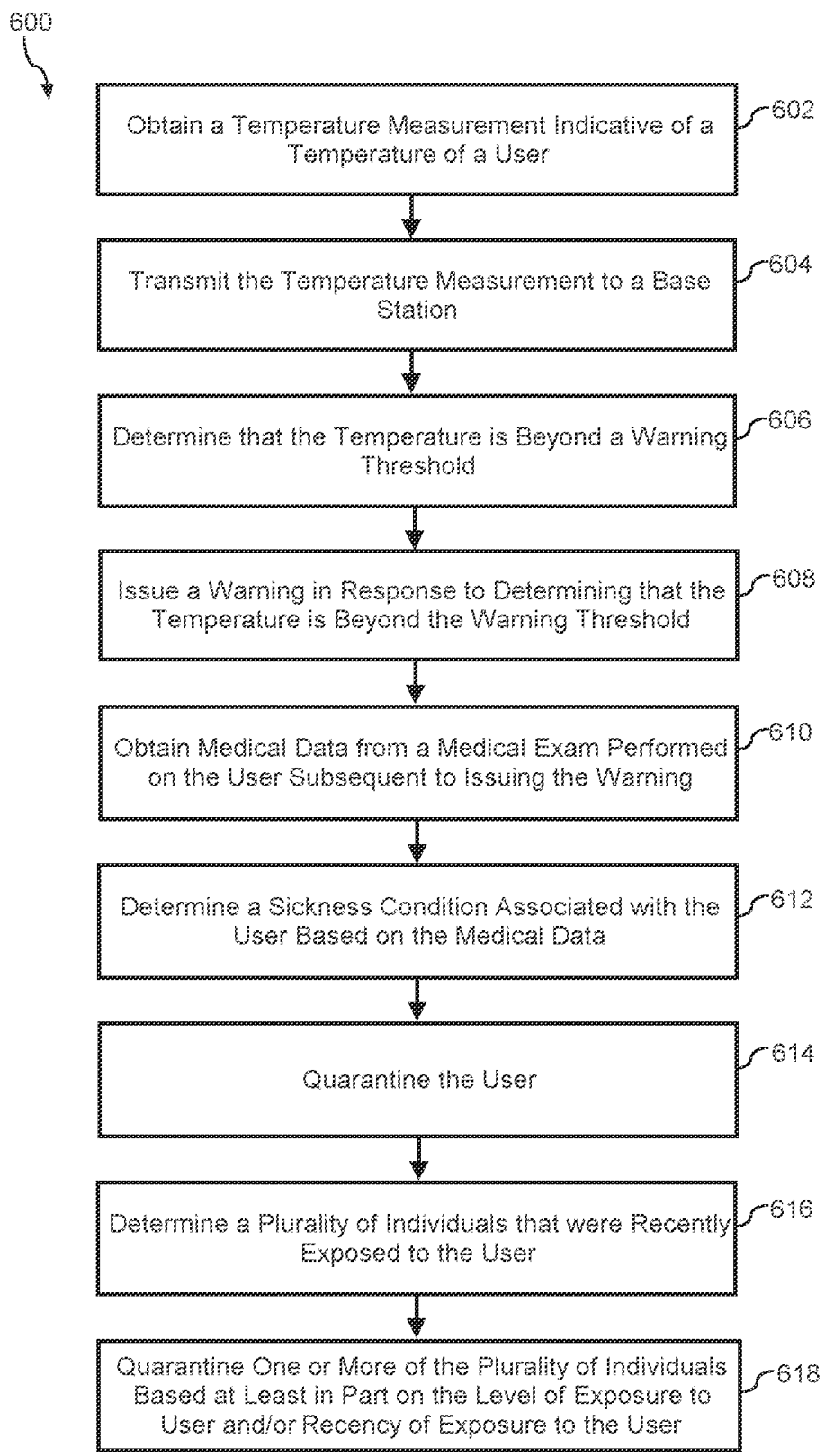
FIG. 6 depicts an example method for preventing transmission of a sickness according to example embodiments of the present disclosure.

FIG. 6 depicts an example method for preventing transmission of a sickness according to example embodiments of the present disclosure. The method may be implemented using, for instance, the sensor assembly discussed above with reference to FIGS. 2-3 (e.g., in a temperature monitoring network as discussed with reference to FIG. 1). FIG. 6 depicts steps performed in a particular order for purposes of illustration and discussion. Those of ordinary skill in the art, using the disclosures provided herein, will understand that various steps of the method may be adapted, modified, rearranged, performed simultaneously or modified in various ways without deviating from the scope of the present disclosure.

The method can include obtaining a temperature measurement indicative of a temperature of a user. The temperature measurement can be a body temperature measurement (e.g., from a body temperature sensor) and/or a corrected temperature measurement as discussed with reference to at least FIG. 4. The temperature measurement can be obtained by a sensor assembly, such as the sensor assembly of FIGS. 2-3.

The method can include transmitting the temperature measurement to a base station. For instance, the temperature measurement can be transmitted from a sensor assembly to a base station, such as by a first communication protocol, such as a wireless modal antenna. In some embodiments, the temperature measurement can first be transmitted from a secondary sensor to a primary sensor by a second communication protocol, such as an NFC protocol.

The method can include determining that the temperature of the user is beyond a warning threshold. For example, the temperature may exceed thresholds defining normal human body temperature (e.g., a fever threshold), such as about 99 degrees Fahrenheit. In some embodiments, a plurality of warning thresholds with varying severities (e.g., a high fever threshold of about 102 degrees Fahrenheit) may be employed.

The method can include issuing a warning in response to determining that the temperature is beyond the warning threshold. For example, a warning can be issued to an observing user and/or other medical professional. the computing system can issue a warning if a user is determined to pose a health concern, such as by having a high temperature and/or a highly changing temperature. In some embodiments, As one example, a computing system coupled to the base station may issue a warning for an affected user and/or the temperature sensor of the affected user can issue a warning, independently and/or coordinated. For example, the temperature sensor can recognize that a temperature measurement is too high and issue a warning locally, without intervention of the computing system. As another example, the computing system can, in addition to issuing a warning at the computing system, transmit a signal to the sensor to cause the sensor to issue the warning. The warning at the sensor can be an audial and/or visual warning, such as a buzzer, light, flashing lights, verbal warning, beeping, or any other suitable warning, and/or combination thereof. In some embodiments, different warning thresholds may cause different warnings of varying severity (e.g., increasing severity with increasing temperature). In some embodiments, the warnings can be nonaudiovisual alerts, such as emails, text messages, etc. For example, the computing system can provide an email notification, text notification, popup notification, etc. to a computing device of an observing party.

The method can include obtaining medical data from a medical exam performed on the user subsequent to issuing the warning. For example, in response to issuing the warning, the user can be located and a medical exam performed on the user. The method can include determining a sickness condition associated with the user based on the medical data. For example, the user can be diagnosed based on the results of the medical exam. The use of a sensor assembly and/or temperature monitoring network according to example aspects of the present disclosure can beneficially facilitate easy location and/or prompt diagnosis of the user, which can prevent additional contact with the user, minimizing risk of transmission once the user is potentially symptomatic.

The method can include quarantining the user. For example, the user can be placed in a location with little to no contact with susceptible individuals. However, in some cases, the user may have inadvertently exposed individuals to a sickness prior to being quarantined. Thus, to limit the spread of infection, it can be necessary to quarantine individuals who were recently in contact with the user to a sufficient degree. Thus, the method can include determining a plurality of individuals who were recently exposed to the user. For example, the use of a sensor assembly and/or temperature monitoring network according to example aspects of the present disclosure can facilitate easier identification of potentially exposed individuals. The method can include quarantining one or more of the plurality of individuals based at least in part on level of exposure to the user and/or recency of exposure to the user. For example, if an individual had sufficiently heavy contact with the user shortly before the user's quarantine, the individual may be quarantined in addition to the user.

FIG. 6 depicts a flow chart of an example, non-limiting method 600 that can be implemented to prevent transmission of a sickness according to example embodiments of the present disclosure. Method 600 can be implemented using, for instance, primary temperature sensor assembly 104a, primary temperature sensor assembly 104b, secondary temperature sensor assembly 106a, secondary temperature sensor assembly 106b, temperature sensor assembly 200, and/or temperature sensor assembly 300 described above and illustrated in the example embodiments depicted in FIGS. 1, 2, and 3. In some embodiments, method 600 can be implemented using one or more of such temperature sensor assemblies in, for example, a temperature monitoring network (e.g., temperature monitoring network 100) as described above with reference to FIG. 1.

FIG. 6 depicts steps performed in a particular order for purposes of illustration and discussion. Those of ordinary skill in the art, using the disclosures provided herein, will understand that various steps of the method may be adapted, modified, rearranged, performed simultaneously, removed, and/or modified in various ways without deviating from the scope of the present disclosure.

In the example embodiment depicted in FIG. 6, at 602, method 600 can include obtaining (e.g., via primary temperature sensor assembly 104a, primary temperature sensor assembly 104b, secondary temperature sensor assembly 106a, secondary temperature sensor assembly 106b, temperature sensor assembly 200, and/or temperature sensor assembly 300) a temperature measurement indicative of a temperature of a user (e.g., a body temperature measurement and/or a corrected temperature measurement of an entity, such as user 102a or user 102b, as described above with reference to the example embodiments depicted in FIGS. 1, 2, 3, and 4).

In this example embodiment, at 604, method 600 can include transmitting (e.g., via base station communication antenna system 318 and/or modal antenna 1410 as described above with reference to FIG. 3) the temperature measurement to a base station (e.g., base station 108). In some embodiments, method 600 can further include, for instance, transmitting (e.g., via intersensor wireless system 316 using an NFC protocol) the temperature measurement to a primary temperature sensor assembly (e.g., primary temperature sensor assembly 104a and/or primary temperature sensor assembly 104b) prior to transmitting the temperature measurement to the base station as described above at 604 of method 600.

In the example embodiment illustrated in FIG. 6, at 606, method 600 can include determining (e.g., via primary temperature sensor assembly 104a, primary temperature sensor assembly 104b, secondary temperature sensor assembly 106a, secondary temperature sensor assembly 106b, temperature sensor assembly 200, temperature sensor assembly 300, and/or computing system 114 as described above with reference to FIGS. 1, 2, and 3) that the temperature of the user is beyond a warning threshold.

In this example embodiment, at 608, method 600 can include issuing (e.g., via primary temperature sensor assembly 104a, primary temperature sensor assembly 104b, secondary temperature sensor assembly 106a, secondary temperature sensor assembly 106b, temperature sensor assembly 200, temperature sensor assembly 300, and/or computing system 114 as described above with reference to FIGS. 1, 2, and 3) a warning (e.g., a buzzer, light, flashing lights, verbal warning, beeping, an e-mail message, text message, popup notification, etc.) in response to determining that the temperature is beyond the warning threshold.

In this example embodiment, at 610, method 600 can include obtaining (e.g., via computing system 114) medical data from a medical exam performed on the user subsequent to issuing the warning. For example, in response to issuing the warning, the user can be located (e.g., via a location finding system of primary temperature sensor assembly 104a, primary temperature sensor assembly 104b, secondary temperature sensor assembly 106a, secondary temperature sensor assembly 106b, temperature sensor assembly 200, and/or temperature sensor assembly 300 as described above with reference to FIGS. 1, 2, and 3)) and a medical exam performed on the user.

In the example embodiment depicted in FIG. 6, at 612, method 600 can include determining (e.g., via computing system 114 and/or an entity as defined herein) a sickness condition associated with the user based on the medical data. For example, the user can be diagnosed based on the results of the medical exam. The use of a sensor assembly and/or temperature monitoring network according to example aspects of the present disclosure can beneficially facilitate easy location and/or prompt diagnosis of the user, which can prevent additional contact with the user, minimizing risk of transmission once the user is potentially symptomatic.

In the example embodiment depicted in FIG. 6, at 614, method 600 can include quarantining the user (e.g., via an entity as defined herein). For example, the user can be placed in a location with little to no contact with susceptible individuals. However, in some cases, the user may have inadvertently exposed individuals to a sickness prior to being quarantined. Thus, to limit the spread of infection, it can be necessary to quarantine individuals who were recently in contact with the user to a sufficient degree.

Therefore, in the example embodiment depicted in FIG. 6, at 616, method 600 can include determining (e.g., via computing system 114 and/or an entity as defined herein) a plurality of individuals who were recently exposed to the user. For example, the use of a sensor assembly and/or temperature monitoring network according to example aspects of the present disclosure can facilitate easier identification of potentially exposed individuals.

In the example embodiment depicted in FIG. 6, at 618, method 600 can include quarantining (e.g., via an entity as defined herein) one or more of the plurality of individuals based at least in part on level of exposure to the user and/or recency of exposure to the user. For example, if an individual had sufficiently heavy contact with the user shortly before the user's quarantine, the individual may be quarantined in addition to the user.

Figure 7:
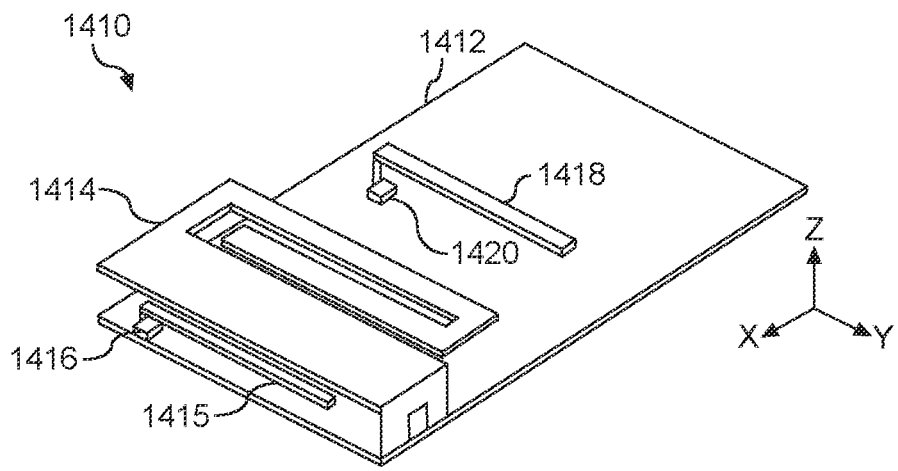
FIG. 7 illustrates an example embodiment of a modal antenna that can be used, for instance, for communications between a temperature sensor and a base station in accordance with aspects of the present disclosure.

FIG. 7 illustrates an example embodiment of a modal antenna 1410 that can be used, for instance, with a network access point and/or one or more client devices in accordance with aspects of the present disclosure. The modal antenna 1410 may include a circuit board 1412 (e.g., including a ground plane) and a driven antenna element 1414 disposed on the circuit board 1412. An antenna volume may be defined between the circuit board (e.g., and the ground plane) and the driven antenna element.

In some embodiments, a first parasitic element 1415 may be positioned at least partially within the antenna volume. A first active element 1416 may be coupled with the parasitic element 1415. The first active element 1416 can be a passive or active component or series of components and may be configured to alter a reactance on the first parasitic element 1415 either by way of a variable reactance, or shorting to ground, resulting in a frequency shift of the antenna.

In some embodiments, a second parasitic element 1418 may be disposed proximate the circuit board 1412 and may be positioned outside of the antenna volume. The second parasitic element 1418 may further include a second active element 1420 which may individually include one or more active and/or passive components. The second active element 1420 can be a passive or active component or series of components and may be configured to alter a reactance on the second parasitic element 1418 either by way of a variable reactance or shorting to ground, resulting in a frequency shift of the antenna. The second parasitic element 1418 may be positioned adjacent the driven element 1414 and may also be positioned outside of the antenna volume.

The described configuration may provide an ability to shift the radiation pattern characteristics of the driven antenna element by varying a reactance thereon. Shifting the antenna radiation pattern can be referred to as "beam steering". In instances where the antenna radiation pattern comprises a null, a similar operation can be referred to as "null steering" since the null can be shifted to an alternative position about the antenna (e.g., to reduce interference). In some embodiments, the second active element 1420 may include a switch for connecting the second parasitic to ground when "On" and for terminating the short when "Off". It should however be noted that a variable reactance on either of the first or second parasitic elements, for example by using a variable capacitor or other tunable component, may further provide a variable shifting of the antenna pattern or the frequency response. For example, the first active element 716 and/or second active element 1420 may include at least one of a tunable capacitor, MEMS device, tunable inductor, switch, a tunable phase shifter, a field-effect transistor, or a diode.

FIG. 7 illustrates an orthogonal view of an example, non-limiting modal antenna 1410 that can be included in and/or coupled to, for instance, a temperature sensor assembly and/or a base station in accordance with example embodiments of the present disclosure. For example, modal antenna 1410 according to example embodiments of the present disclosure can be included in and/or coupled to primary temperature sensor assembly 104*a*, primary temperature sensor assembly 104*b*, secondary temperature sensor assembly 106*a*, secondary temperature sensor assembly 106*b*, temperature sensor assembly 200, temperature sensor assembly 300, and/or base station 108 as described above with reference to FIGS. 1, 2, and 3.

Modal antenna 1410 according to example embodiments of the present disclosure can include a circuit board 1412 (e.g., including a ground plane) and a driven antenna element 1414 that can be disposed on circuit board 1412. In some example embodiments, an antenna volume (not annotated in FIG. 7) can be defined between circuit board 1412 (e.g., between a ground plane of circuit board 1412) and driven antenna element 1414.

In some example embodiments, a first parasitic element 1415 can be positioned at least partially within the above-described antenna volume (e.g., as illustrated in FIG. 7) and/or coupled to a first active element 1416 and/or circuit board 1412. First active element 1416 according to example embodiments of the present disclosure can be coupled to first parasitic element 1415 and/or circuit board 1412. In some example embodiments, first active element 1416 can include and/or be provided as a passive or active component and/or a series of components (e.g., passive and/or active components). In these example embodiments, first active element 1416 can be configured to alter a reactance on first parasitic element 1415, for instance, by way of a variable reactance or shorting to ground, resulting in a frequency shift of modal antenna 1410 and/or driven antenna element 1414.

In some example embodiments, a second parasitic element 1418 can be positioned outside of the above-described antenna volume (e.g., proximate circuit board 1412 as illustrated in FIG. 7) and/or coupled to a second active element 1420 and/or circuit board 1412. Second active element 1420 according to example embodiments of the present disclosure can be coupled to second parasitic element 1418 and/or circuit board 1412. In some example embodiments, second active element 1420 can include and/or be provided as a passive or active component and/or a series of components (e.g., passive and/or active components). In these example embodiments, second active element 1420 can be configured to alter a reactance on second parasitic element 1418, for instance, by way of a variable reactance or shorting to ground, resulting in a frequency shift of modal antenna 1410. As illustrated in the example embodiment depicted in FIG. 7, second parasitic element 1418 can be positioned adjacent driven antenna element 1414 and/or positioned outside of the above-described antenna volume.

According to example embodiments of the present disclosure, the above-described configuration of the example, non-limiting embodiment of modal antenna 1410 depicted in FIG. 7 can be configured to shift the radiation pattern characteristics of modal antenna 1410 and/or driven antenna element 1414 by varying a reactance on driven antenna element 1414. Shifting a radiation pattern of an antenna can be referred to as "beam steering". In embodiments where such a radiation pattern includes a null, a similar operation can be referred to as "null steering" since the null can be shifted to an alternative position about the antenna (e.g., to reduce signal interference). In some embodiments, second active element 1420 can include a switch (not illustrated in FIG. 7) that can connect (e.g., short) second parasitic element 1418 to ground when "On" and can terminate such a connection (e.g., terminate the short) when "Off". It should however be noted that, in some example embodiments of the present disclosure, a variable reactance on first parasitic element 1415 or second parasitic element 1418, for instance by using a variable capacitor or another tunable component, can further provide a variable shifting of a radiation pattern or the frequency response of modal antenna 1410 and/or driven antenna element 1414. For example, in some embodiments, first active element 1416 and/or second active element 1420 can include a tunable capacitor, a microelectromechanical (MEMS) device, a tunable inductor, a switch, a tunable phase shifter, a field-effect transistor, and/or a diode.

Figure 8:
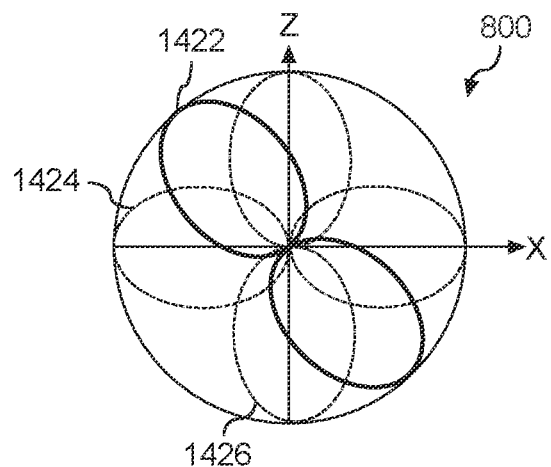
FIG. 8 illustrates a two-dimensional antenna radiation pattern associated with the modal antenna of FIG. 7.

FIG. 8 illustrates a two-dimensional antenna radiation pattern associated with the modal antenna of FIG. 7. The radiation pattern may be shifted by controlling an electrical characteristic associated with at least one of the first and/or second parasitic elements 1415, 1418 of the modal antenna 1410. For example, in some embodiments, the radiation pattern may be shifted from a first mode 1422 to a second mode 1424, or a third mode 1426 and so forth.

FIG. 8 illustrates a diagram of an example, non-limiting two-dimensional antenna radiation pattern 800 that can be associated with modal antenna 1410 in accordance with example embodiments of the present disclosure. According to example embodiments of the present disclosure, radiation pattern 800 can be shifted (e.g., via base station 108, base station communication antenna system 318, modal antenna 1410, etc.) by controlling an electrical characteristic associated with first parasitic element 1415 and/or second parasitic element 1418 of modal antenna 1410 as described above with reference to FIG. 7. For example, in some embodiments, radiation pattern 800 can be shifted from a first mode 1422 to a second mode 1424, or a third mode 1426 and/or to another mode. In these embodiments, such shifting of radiation pattern 800 can constitute a beam steering operation that can reduce signal interference associated with a signal communicated between, for instance, base station 108 and one or more temperature sensor assemblies described herein, increase signal strength of the signal, and/or improve capacity of a network (e.g., temperature monitoring network 100).

Figure 9:
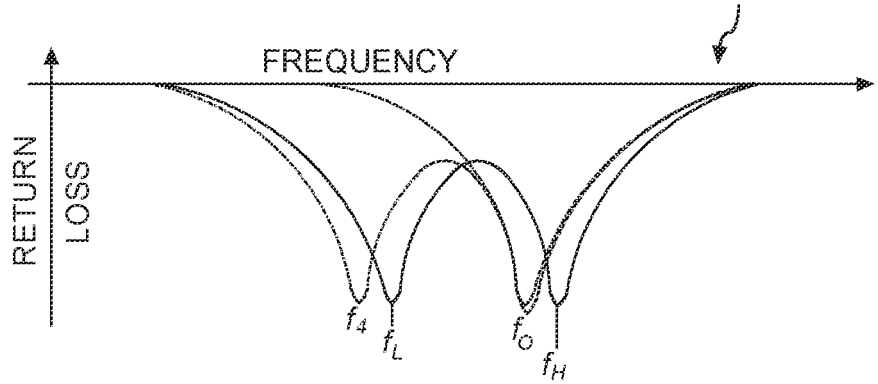
FIG. 9 illustrates an example frequency plot of the modal antenna of FIG. 7 according to example aspects of the present disclosure.

FIG. 9 illustrates an example frequency plot of the modal antenna of FIG. 7 according to example aspects of the present disclosure. The frequency of the antenna can be shifted by controlling an electrical characteristic associated with at least one of the first and/or second parasitic elements 1415, 1418 of the modal antenna 1410. For example, a first frequency ($f_0$) of the antenna may be achieved when the first and second parasitic elements are switched "Off"; the frequencies ($f_L$) and ($f_H$) may be produced when the second parasitic is shorted to ground; and the frequencies ($f_4$; $f_0$) may be produced when the first and second parasitic elements are each shorted to ground. It should be understood that other configurations are possible within the scope of this disclosure. For example, more or fewer parasitic elements may be employed. The positioning of the parasitic elements may be altered to achieve additional modes that may exhibit different frequencies and/or combinations of frequencies.

FIG. 9 illustrates a diagram of an example, non-limiting frequency plot 900 of modal antenna 1410 according to example embodiments of the present disclosure. According to example embodiments of the present disclosure, the frequency of modal antenna 1410 and/or driven antenna element 1414 can be shifted (e.g., via base station 108, base station communication antenna system 318, modal antenna 1410, etc.) by controlling an electrical characteristic associated with first parasitic element 1415 and/or second parasitic element 1418 of modal antenna 1410 as described above with reference to FIG. 7. For example, in some example embodiments, a first frequency ($f_0$) of modal antenna 1410 be achieved when first parasitic element 1415 and second parasitic element 1418 are switched "Off"; the frequencies ($f_L$) and ($f_H$) can be produced when second parasitic element 1418 is shorted to ground; and the frequencies ($f_4$; $f_0$) can be produced when first parasitic element 1415 and second parasitic element 1418 are each shorted to ground. It should be understood that other configurations are possible within the scope of this disclosure. For example, in some embodiments, more or fewer parasitic elements can be employed (e.g., more or fewer parasitic elements can be included with and/or employed by modal antenna 1410). In some example embodiments, the positioning of first parasitic element 1415, second parasitic element 1418, and/or another parasitic element(s) can be altered to achieve additional modes that can exhibit different frequencies and/or combinations of frequencies.

FIGS. 7-9 depict one example modal antenna having a plurality of modes for purposes of illustration and discussion. Those of ordinary skill in the art, using the disclosures provided herein, will understand that other modal antennas and/or antenna configurations can be used without deviating from the scope of the present disclosure.

Figure 10:
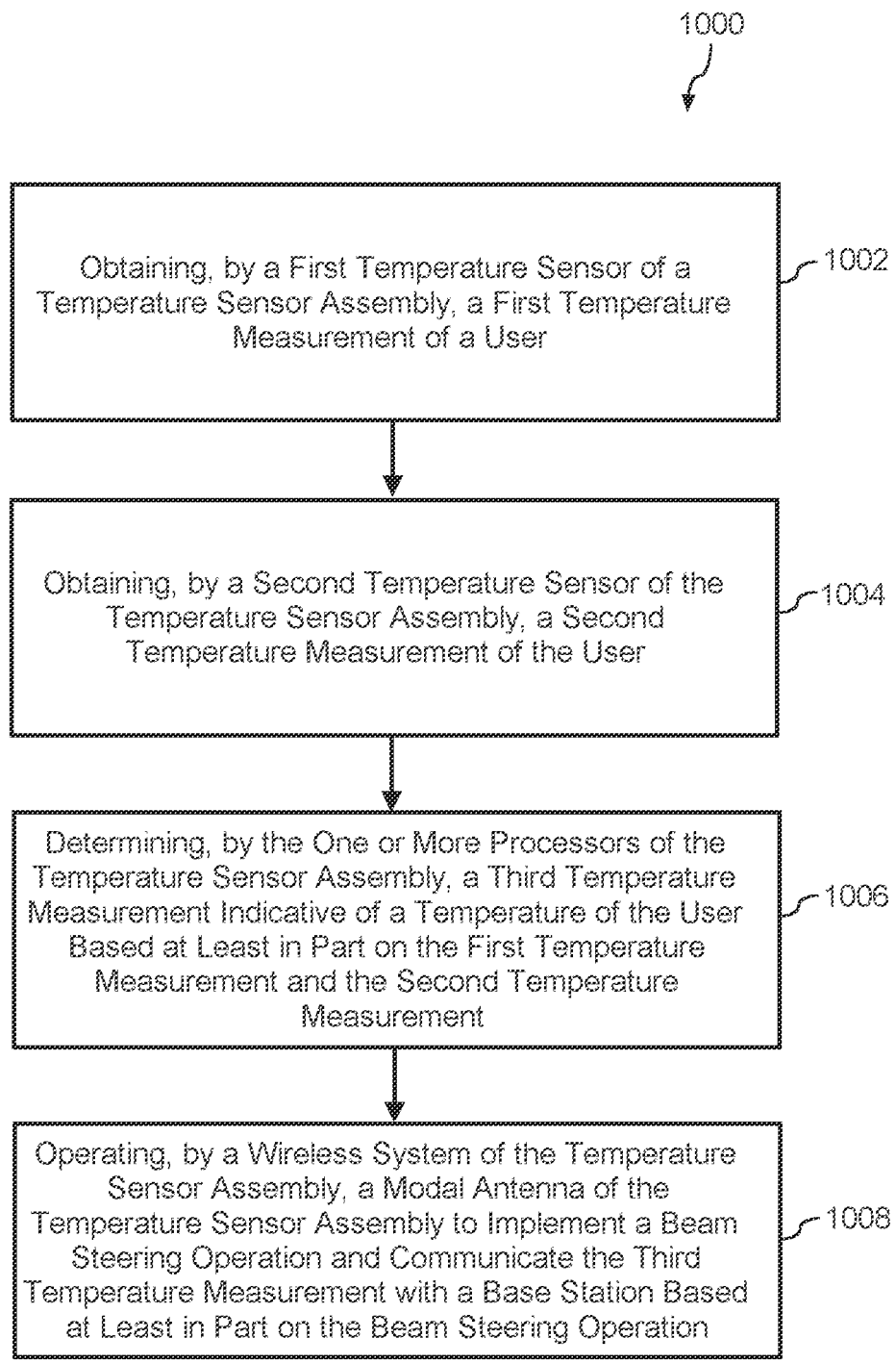
FIG. 10 depicts a flow chart of an example, non-limiting method that can be implemented to operate a temperature sensor assembly according to example embodiments of the present disclosure.

FIG. 10 depicts a flow chart of an example, non-limiting method 1000 that can be implemented to operate a temperature sensor assembly according to example embodiments of the present disclosure. Method 1000 can be implemented using, for instance, primary temperature sensor assembly 104a, primary temperature sensor assembly 104b, secondary temperature sensor assembly 106a, secondary temperature sensor assembly 106b, temperature sensor assembly 200, and/or temperature sensor assembly 300 described above and illustrated in the example embodiments depicted in FIGS. 1, 2, and 3. In some embodiments, method 1000 can be implemented using one or more of such temperature sensor assemblies in, for example, a temperature monitoring network (e.g., temperature monitoring network 100) as described above with reference to FIG. 1.

FIG. 10 depicts steps performed in a particular order for purposes of illustration and discussion. Those of ordinary skill in the art, using the disclosures provided herein, will understand that various steps of the method may be adapted, modified, rearranged, performed simultaneously, removed, and/or modified in various ways without deviating from the scope of the present disclosure.

In the example embodiment depicted in FIG. 10, at 1002, method 1000 can include obtaining, by a first temperature sensor (e.g., body temperature sensor 304) of a temperature sensor assembly (e.g., primary temperature sensor assembly 104a, primary temperature sensor assembly 104b, secondary temperature sensor assembly 106a, secondary temperature sensor assembly 106b, temperature sensor assembly 200, and/or temperature sensor assembly 300), a first temperature measurement (e.g., a body temperature measurement) of a user (e.g., an entity, such as user 102a or user 102b).

In this example embodiment, at 1004, method 1000 can include obtaining, by a second temperature sensor (e.g., ambient temperature sensor 308) of the temperature sensor assembly, a second temperature measurement (e.g., an ambient temperature measurement) of the user.

In this example embodiment, at 1006, method 1000 can include determining, by one or more processors (e.g., processor(s) 310 using the correlation function described above with reference to FIGS. 1, 2, and 3) of the temperature sensor assembly, a third temperature measurement (e.g., the corrected temperature measurement described above with reference to FIGS. 1, 2, and 3) indicative of a temperature (e.g., an absolute and/or core temperature measurement) of the user based at least in part on the first temperature measurement and the second temperature measurement.

In this example embodiment, at 1008, method 1000 can include operating, by a wireless system (e.g., wireless system 314) of the temperature sensor assembly, a modal antenna (e.g., modal antenna 1410) of the temperature sensor assembly to implement a beam steering operation and communicate the third temperature measurement with a base station (e.g., base station 108) based at least in part on the beam steering operation (e.g., as described above with reference to the example embodiments depicted in FIGS. 1, 2, 3, 7, 8, and 9).

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A temperature sensor assembly, comprising:
    a first temperature sensor configured to obtain a first temperature measurement of a user;
    a second temperature sensor configured to obtain a second temperature measurement of the user;
    one or more processors configured to determine a third temperature measurement indicative of a temperature of the user based at least in part on the first temperature measurement and the second temperature measurement; and
    a base station communication antenna system comprising a modal antenna configured to communicate the third temperature measurement with a base station based at least in part on a beam steering operation.

2. The temperature sensor assembly of claim 1, further comprising:
    an intersensor wireless system configured to communicate at least one of the first temperature measurement, the second temperature measurement, or the third temperature measurement with one or more temperature sensor assemblies.

3. The temperature sensor assembly of claim 2, further comprising:
    a wireless system configured to operate at least one of:
    the intersensor wireless system to communicate one or more temperature measurements with the one or more temperature sensor assemblies; or
    the base station communication antenna system to communicate the one or more temperature measurements with the base station.

4. The temperature sensor assembly of claim 1, wherein at least one of the base station communication antenna system or the modal antenna is configured to shift a radiation pattern associated with the modal antenna to perform the beam steering operation, and wherein the beam steering operation reduces signal interference associated with a signal communicated by the modal antenna, increases signal strength of the signal, or improves capacity of a network.

5. The temperature sensor assembly of claim 4, wherein at least one of the base station communication antenna system or the modal antenna is configured to steer at least one of:
    one or more nulls of the radiation pattern in a first direction toward one or more temperature sensor assemblies; or
    one or more nodes of the radiation pattern in a second direction toward the base station.

6. The temperature sensor assembly of claim 1, wherein at least one of the base station communication antenna system or the modal antenna is configured to shift a frequency of the modal antenna.

7. The temperature sensor assembly of claim 1, wherein the temperature sensor assembly is coupled to the user and further comprises:
    a location finding system that provides a location of the user.

8. The temperature sensor assembly of claim 1, wherein the modal antenna comprises:
    a circuit board including a ground plane;
    a driven antenna element disposed on the circuit board;
    a first active element and a second active element disposed on the circuit board;
    a first parasitic element coupled to at least one of the circuit board or the first active element, the first active element configured to alter a reactance on the first parasitic element to provide a frequency shift of at least one of the modal antenna or the driven antenna element; and
    a second parasitic element coupled to at least one of the circuit board or the second active element, the second active element configured to alter a reactance on the second parasitic element to provide the frequency shift.

9. The temperature sensor assembly of claim 1, wherein the one or more processors are configured to determine the third temperature measurement based at least in part on a correlation function, and wherein the first temperature measurement comprises a body temperature measurement of the user, the second temperature measurement comprises an ambient temperature measurement of the user, and the third temperature measurement comprises a corrected temperature measurement that compensates an effect of the ambient temperature measurement on the body temperature measurement.

10. A method of operating a temperature sensor assembly, the method comprising:
    obtaining, by a first temperature sensor of the temperature sensor assembly, a first temperature measurement of a user;
    obtaining, by a second temperature sensor of the temperature sensor assembly, a second temperature measurement of the user;

determining, by one or more processors of the temperature sensor assembly, a third temperature measurement indicative of a temperature of the user based at least in part on the first temperature measurement and the second temperature measurement; and operating, by a wireless system of the temperature sensor assembly, a modal antenna of the temperature sensor assembly to implement a beam steering operation and communicate the third temperature measurement with a base station based at least in part on the beam steering operation.

11. The method of claim 10, further comprising:
communicating, by an intersensor wireless system of the temperature sensor assembly, at least one of the first temperature measurement, the second temperature measurement, or the third temperature measurement with one or more temperature sensor assemblies.

12. The method of claim 10, wherein the operating, by the wireless system, the modal antenna to implement the beam steering operation comprises:
operating, by the wireless system, the modal antenna to shift a radiation pattern associated with the modal antenna to reduce signal interference associated with a signal communicated by the modal antenna, increase signal strength of the signal, or improve capacity of a network.

13. The method of claim 12, wherein the operating, by the wireless system, the modal antenna to shift the radiation pattern associated with the modal antenna comprises:
operating, by the wireless system, the modal antenna to steer at least one of:
one or more nulls of the radiation pattern in a first direction toward one or more temperature sensor assemblies; or
one or more nodes of the radiation pattern in a second direction toward the base station.

14. The method of claim 10, further comprising:
operating, by the wireless system, the modal antenna to shift a frequency of the modal antenna.

15. The method of claim 10, further comprising:
providing, by a location finding system of the temperature sensor assembly, a location of the user, wherein the temperature sensor assembly is coupled to the user.

16. A base station, comprising:
a computer-readable memory;
one or more processors; and
a first modal antenna configured to communicate with one or more temperature sensor assemblies respectively coupled to one or more users,
wherein the one or more temperature sensor assemblies respectively comprise a second modal antenna configured to communicate at least one temperature measurement of a user with the base station based at least in part on a beam steering operation.

17. The base station of claim 16, wherein the first modal antenna is configured to communicate a signal associated with a warning that the at least one temperature measurement exceeds a defined temperature measurement threshold.

18. The base station of claim 16, wherein the at least one temperature measurement of the user comprises at least one of:
a body temperature measurement of the user that is obtained by a first temperature sensor of a temperature sensor assembly coupled to the user;
an ambient temperature measurement of the user that is obtained by a second temperature sensor of the temperature sensor assembly; or
a corrected temperature measurement indicative of a temperature of the user that is determined by one or more processors of the temperature sensor assembly based at least in part on the body temperature measurement and the ambient temperature measurement.

19. The base station of claim 16:
wherein the first modal antenna is configured to shift a first radiation pattern associated with the first modal antenna to perform a second beam steering operation;
wherein the second modal antenna is configured to shift a second radiation pattern associated with the second modal antenna to perform the beam steering operation; and
wherein at least one of the beam steering operation or the second beam steering operation reduces signal interference associated with a signal communicated between the base station and the one or more temperature sensor assemblies, increases signal strength of the signal, or improves capacity of a network.

20. The base station of claim 16, wherein the first modal antenna is configured to steer at least one of:
one or more nulls of a radiation pattern associated with the first modal antenna in a first direction toward at least one first temperature sensor assembly; or
one or more nodes of the radiation pattern in a second direction toward at least one second temperature sensor assembly.

* * * * *